(12) United States Patent
Takanashi

(10) Patent No.: US 6,393,217 B1
(45) Date of Patent: May 21, 2002

(54) CAMERA

(75) Inventor: Tatsuo Takanashi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 28 days.

(21) Appl. No.: 09/680,103

(22) Filed: Oct. 5, 2000

(30) Foreign Application Priority Data

Oct. 7, 1999  (JP) ..................................... H11-287124
Jan. 12, 2000 (JP) ..................................... 2000-003950
Aug. 28, 2000 (JP) ..................................... 2000-257724

(51) Int. Cl.$^7$ ............................................... G03B 5/00
(52) U.S. Cl. ........................................ 396/77; 396/349
(58) Field of Search .......................... 396/76, 77, 87, 396/349

(56) References Cited

U.S. PATENT DOCUMENTS 5,150,147 A * 9/1992 Kobayashi et al. ............ 396/76
5,170,201 A * 12/1992 Akiyama et al. .............. 396/77
5,819,120 A * 10/1998 Hamada et al. ............... 396/77

FOREIGN PATENT DOCUMENTS

| JP | 62-246020 | 10/1987 | ............ G03B/7/26 |
| JP | 1-231035 | 9/1989 | ............ G03B/17/18 |
| JP | 3-60331 | 6/1991 | ............ G03B/17/04 |
| JP | 9-90453 | 4/1997 | ............ G03B/5/00 |
| JP | 11-24118 | 1/1999 | ............ G03B/5/00 |

* cited by examiner

Primary Examiner—W. B. Perkey
(74) Attorney, Agent, or Firm—Ostrolenk, Faber, Gerb & Soffen, LLP

(57) ABSTRACT

In this camera, a non-operation continuation time of a camera operation switch in a lens barrel extended state is clocked, the extended state of the lens barrel is checked when the continuation time exceeds a predetermined first reference time shorter than the continuation time. The lens barrel is immediately extended when the lens barrel is extended to a tele-end position. When the lens barrel is not located at the tele-end position, the camera waits until the continuation time exceeds a predetermined second reference time longer than the continuation time, and the lens barrel is withdrawn to a collapse position. According to the camera, a photographic lens whose focal length can be changed or varied is automatically withdrawn at an appropriate time, lens frames are sufficiently protected, and the lens barrel can be prevented from being unnecessarily collapsed without missing the moment for a good picture.

78 Claims, 13 Drawing Sheets

FIG.12

| FOCAL DISTANCE OF PHOTOGRAPHIC LENS (INITIAL) | ELAPSED TIME/LENS OPERATION |
|---|---|
| ● TELEPHOTO | $T_A$ COLLAPSE BARREL |
| ○———● TELEPHOTO   WIDE ANGLE | $T_B$ NON-OPERATION START — COLLAPSE BARREL |

FIG.13

| FOCAL DISTANCE OF PHOTOGRAPHIC LENS (INITIAL) | ELAPSED TIME/LENS OPERATION |
|---|---|
| ● TELEPHOTO | $T_A$ COLLAPSED BARREL |
| ○———○ TELEPHOTO   WIDE ANGLE | $T_D$ COLLAPSE BARREL |
| ● WIDE ANGLE | $T_E$ NON-OPERATION START — COLLAPSE BARREL |

FIG.14

| FOCAL DISTANCE OF PHOTOGRAPHIC LENS (INITIAL) | ELAPSED TIME/LENS OPERATION |
|---|---|
| ● TELEPHOTO | $T_C$ → TO INTERMEDIATE ZOOM POSITION, $T_D$ → COLLAPSE BARREL |
| ○—○—○ TELEPHOTO — STANDARD FOCAL DISTANCE — WIDE ANGLE | $T_D$ → TO INTERMEDIATE ZOOM POSITION, $T_D$ → COLLAPSE BARREL |
| ● STANDARD FOCAL DISTANCE | $T_D$ → COLLAPSE BARREL |
| ● WIDE ANGLE | $T_E$ NON-OPERATION START → COLLAPSE BARREL |

FIG.15

| FOCAL DISTANCE OF PHOTOGRAPHIC LENS (INITIAL) | ELAPSED TIME/LENS OPERATION |
|---|---|
| ● TELEPHOTO | $T_C$ → TO INTERMEDIATE ZOOM POSITION, $T_D$ → COLLAPSE BARREL |
| ○—○—○ TELEPHOTO — STANDARD FOCAL DISTANCE — WIDE ANGLE | $T_D$ → TO INTERMEDIATE ZOOM POSITION, $T_D$ → COLLAPSE BARREL |
| ● STANDARD FOCAL DISTANCE | $T_D$ → COLLAPSE BARREL |
| ● WIDE ANGLE | $T_E$ NON-OPERATION START → TO INTERMEDIATE ZOOM POSITION, $T_D$ → COLLAPSE BARREL |

FIG.16

| FOCAL DISTANCE OF PHOTOGRAPHIC LENS (INITIAL) | ELAPSED TIME/LENS OPERATION |
|---|---|
| ● TELEPHOTO | $T_C$ TO INTERMEDIATE ZOOM POSITION → $T_D$ COLLAPSE BARREL |
| ○———○ TELEPHOTO  STANDARD FOCAL DISTANCE | $T_D$ TO INTERMEDIATE ZOOM POSITION → $T_D$ COLLAPSE BARREL |
| ● STANDARD FOCAL DISTANCE | $T_D$ COLLAPSE BARREL |
| ●———○ STANDARD  WIDE FOCAL DISTANCE  ANGLE | $T_E$ NON-OPERATION START → COLLAPSE BARREL |

FIG.17

| FOCAL DISTANCE OF PHOTOGRAPHIC LENS (INITIAL) | ELAPSED TIME/LENS OPERATION |
|---|---|
| ● TELE PHOTO | $T_C$ → TO INTERMEDIATE ZOOM POSITION, $T_D$ → COLLAPSE BARREL |
| ○——○ TELE PHOTO — STANDARD FOCAL DISTANCE | $T_D$ → TO INTERMEDIATE ZOOM POSITION, $T_D$ → COLLAPSE BARREL |
| ● STANDARD FOCAL DISTANCE | $T_D$ → COLLAPSE BARREL |
| ○——○ STANDARD FOCAL DISTANCE — WIDE ANGLE | $T_C$ → TO WIDE POSITION, $T_E$ → COLLAPSE BARREL |
| ● WIDE ANGLE | $T_E$ → NON-OPERATION START ... COLLAPSE BARREL |

FIG.18

| FOCAL DISTANCE OF PHOTOGRAPHIC LENS (INITIAL) | ELAPSED TIME/LENS OPERATION |
|---|---|
| ● TELE PHOTO<br>● fo<br>● WIDE ANGLE | $T_C$<br>$T_{fo}$<br>$T_E$<br>NON-OPERATION START → COLLAPSE BARREL |

CAMERA

This application claims benefit of Japanese Applications No. Hei 11-287124 filed in Japan on Oct. 7, 1999, No. 2000-3950 filed in Japan on Jan. 12, 2000, and No. 2000-257724 filed in Japan on Aug. 28, 2000, the contents of which are incorporated by this reference.

BACKGROUND OF THE INVENTION

1. Field of the Invention

The present invention relates to a camera having a photographic lens whose focal length can be changed or varied and which can be driven at a storable position, a photographable position, a photographic preparation, or the like,

2. Description of the Related Art

A conventional camera having a zoom lens barrel whose focal length can be changed and which can be moved between a storable position and a photographable position in a collapsible-barrel type camera is disclosed in Japanese Unexamined Patent Publication No. 11-24118. In this camera, a barrel is automatically moved into a collapsed position when a photographic operation of the camera is not performed for a predetermined time period, i.e., when a non-operation state continues for a predetermined time period in a photographable state. When the barrel is stored, the barrel is protected from unexpected external force.

However, in the collapsible-barrel type camera disclosed in Japanese Unexamined Patent Publication No. 11-24118, the lens barrel is collapsed after a predetermined time period irrespective of the operating position of the lens barrel. This is undesirable.

When the lens barrel is in the zoom position, it extends a long distance out of the camera and can be easily damaged. As such, it is desirable to withdraw the lens barrel into the collapsed position after a relatively short period of time has passed without the camera being operated. In contrast, the lens barrel only extends a short distance from the camera when it is in the wide angle position. Since it is less likely to be damaged in this position, it is safe to wait a longer period of time before moving the lens barrel into the collapsed position.

Because Japanese Unexamined Patent Publication No. 11-24118 waits the same period of time before withdrawing the lens barrel into the collapsed position irrespective of the operating position (zoom or wide angle) of the lens barrel, it will withdraw the lens barrel into the collapsed, non-operative, position sooner than necessary when it is in the wide angle position. This is undesirable for several reasons.

A user may miss the moment for a good picture because a long time period is required to re-extend the lens barrel and perform a photographic preparation again. In addition, the lens barrel is unnecessarily reciprocated and power consumption increases.

OBJECT AND SUMMARY OF THE INVENTION

The present invention is made to solve the above drawbacks, and has as its object to provide a camera in which a photographic lens whose focal length can be changed or varied can be driven to a storage position and a photographable position, wherein the photographic lens is automatically withdrawn to an appropriate timing, a lens frame is sufficiently protected, and the photographic lens is not unnecessarily collapsed to avoid from missing the moment for a good picture.

According to the present invention, there is provided to a camera including: a photographic lens having an optical system whose focal length can be changed or varied; a photographic lens drive mechanism for driving the photographic lens to a position of a storage state and a position of a photographable state and for driving the photographic lens to change or vary the focal length of the photographic lens; an encoder for detecting the focal length of the photographic lens; a timer for clocking a non-operation state continuation time of the camera in the photographable state; a timer output decision circuit, having pieces of reference decision time information to be compared with a clocking output from the timer, for comparing the clocking output with one of the pieces of reference decision time information according to an output from the encoder to decide whether the output from the timer reaches the reference decision time information or not; and a control circuit for driving the photographic lens drive mechanism according to an output from the timer output decision circuit to drive the photographic lens to the position of the storage state, wherein the photographic lens is driven to be automatically withdrawn to the position of the storage state at a necessary timing on the basis of an output from the encoder and an output from the timer to effectively protect a lens frame.

Other characteristic features and advantages of the present invention will be apparent from the following description.

BRIEF OF DESCRIPTION OF THE DRAWINGS

FIG. 12 is a diagram showing an operation of a photographic lens when a non-operation state continues when the photographic lens is set at focal lengths in the camera according to the first embodiment.

FIG. 13 is a diagram showing an operation of a photographic lens when a non-operation state continues when the photographic lens is set at focal lengths in the camera according to the second embodiment.

FIG. 14 is a diagram showing an operation of a photographic lens when a non-operation state continues when the photographic lens is set at focal lengths in the camera according to the third embodiment.

FIG. 15 is a diagram showing an operation of a photographic lens when a non-operation state continues when the photographic lens is set at focal lengths in the camera according to the fourth embodiment.

FIG. 16 is a diagram showing an operation of a photographic lens when a non-operation state continues when the photographic lens is set at focal lengths in the camera according to the fifth embodiment.

FIG. 17 is a diagram showing an operation of a photographic lens when a non-operation state continues when the photographic lens is set at focal lengths in the camera according to the sixth embodiment.

FIG. 18 is a diagram showing an operation of a photographic lens when a non-operation state continues when the photographic lens is set at focal lengths in the camera according to the seventh embodiment.

DETAILED DESCRIPTION OF THE PREFERRED EMBODIMENTS

Embodiments of the present invention will be described below with reference to the accompanying drawings.

First Embodiment

Figure 1A:
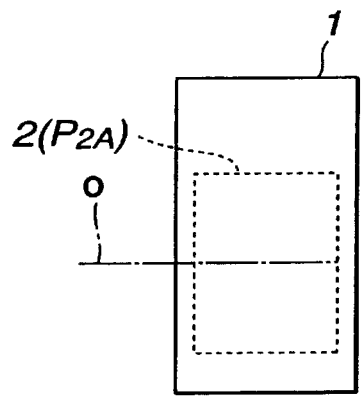
FIG. 1A is a side view of a lens barrel of a camera according to the first embodiment of the present invention, and shows a collapsed state of the lens barrel.
Figure 1B:
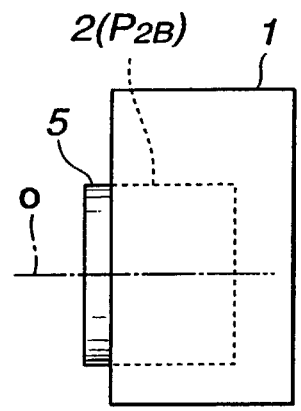
FIG. 1B is a side view of the lens barrel of the camera according to the first embodiment, and shows a wide-end extended state of the lens barrel.
Figure 1C:
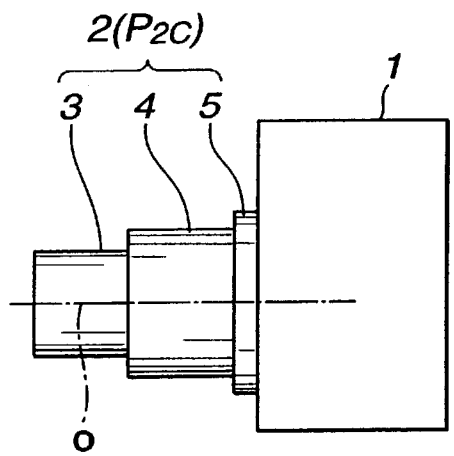
FIG. 1C is a side view of the lens barrel of the camera according to the first embodiment, and shows an intermediate extended state of the lens barrel.
Figure 1D:
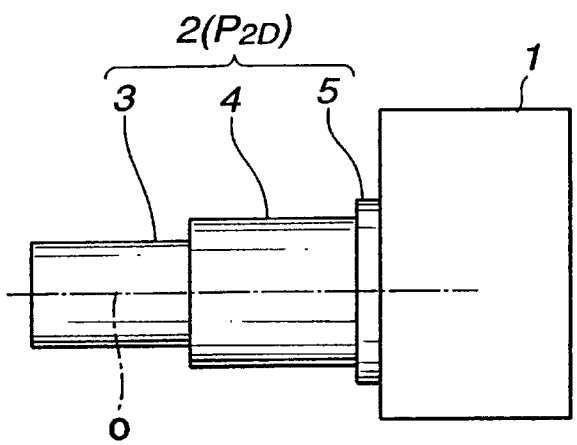
FIG. 1D is a side view of the lens barrel of the camera according to the first embodiment, and shows a tele-end extended state of the lens barrel.
Figure 2:
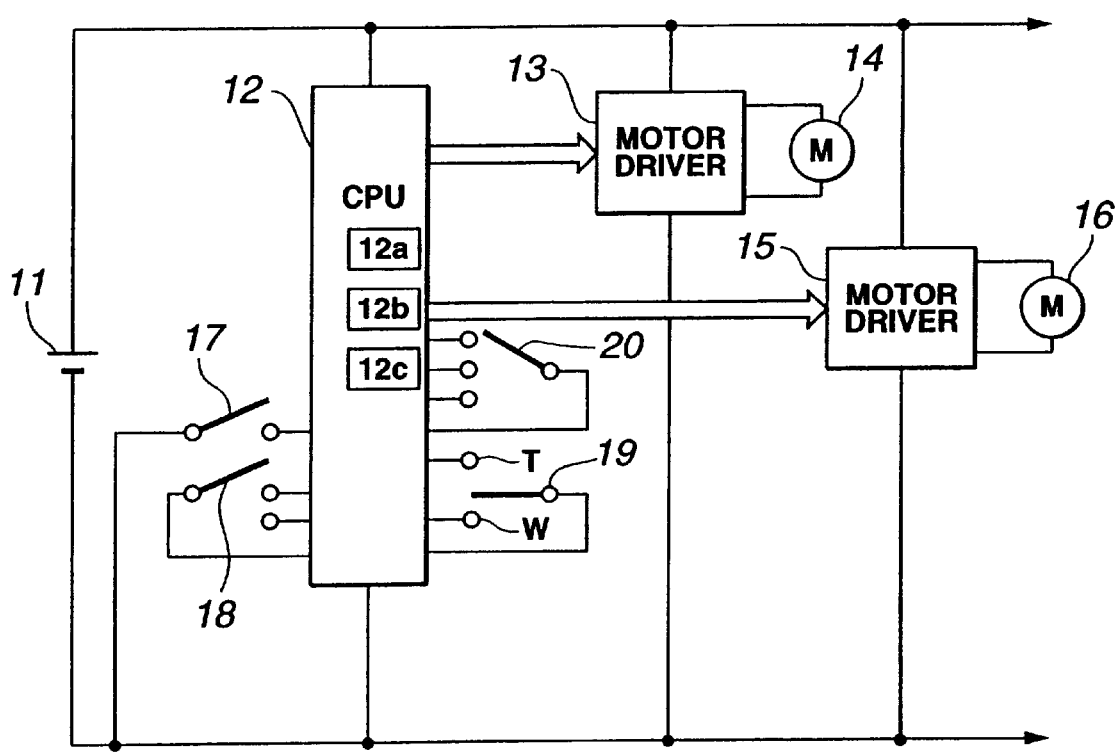
FIG. 2 is a main block diagram of an electric control circuit section of the camera according to the first embodiment.

FIGS. 1A to 1D are side views of a camera having a photographic lens barrel in various extension positions according to the first embodiment of the present invention. FIG. 1A shows the condition of the lens barrel in its storage or collapsed position. FIG. 1B shows the condition of the lens barrel in its wide angle zoom position, FIG. 1C shows the condition of the lens barrel in its standard or intermediate zoom position, and FIG. 1D shows the condition of the lens barrel in its telephoto position. FIG. 2 is a block diagram of a main part of an electric control circuit section in the camera.

The camera according to this embodiment has a zoom type lens barrel 2 which can be collapsed. The lens barrel 2 is mainly constituted by a first frame 3 having a plurality of lenses which move relative to one another, a second frame 4, and a third frame 5. Depending on the configuration of the zoom lens, the lenses may be held in the frames or not.

As shown in FIGS. 1A to 1D, the lens barrel 2 can be reciprocated between a collapsed or storage position and a telephoto position. The camera is in a photographic state, wherein it can take a picture, whenever the lens barrel is in the wide angle position P2B show in FIG. 1B, the telephone position P2D shown in FIG. 1D or anywhere therebetween. The collapsed position serves as a non-photographic state in which the lens barrel 2 is stored. The wide angle position is the smallest focal length of the photographic position. The telephoto position is the largest focal length position of the photographic positions. A standard zoom position P2C located approximately intermediate the wide angle and telephoto positions is shown in FIG. IC.

In the storage position of the lens barrel 2, the lens frames 3, 4, and 5 are all withdrawn into the camera body 1 in a collapsed position P2A (see FIG. 1A).

In the wide angle position, the third frame 5 extends to position P2B where the front portion of the third frame 5 is extended slightly from the camera body 1. In this position, the third frame 5 houses both the first frame 3 and the second frame 4 (see FIG. 1B).

In the standard zoom position, the first frame 3 and the second frame 4 extend to an intermediate position P2C shown in FIG. 1C.

In the telephoto zoom position, the first frame 3 and the second frame 4 extend to the position P2D shown in FIG. 1D.

The electronic control circuit section of the camera comprises, as shown in FIG. 2, a power supply section (battery) 11, a CPU (Central Processing Unit) 12 serving as a control means for controlling the entire operation of the camera, a setup or first motor 14 for a photographic lens drive means for driving the lens frames 3–5 of the lens barrel 2 between the storage position P2A and the wide angle zoom position P2B, a motor driver 13 for the setup motor, a zoom or second motor 16 for a photographic lens drive means for driving the leg frames 3–5 between the wide angle zoom position P2B and the telephoto zoom position P2D to change or to vary the focal length of the lens barrel 2, a motor driver 15 for the zoom motor, a main switch 17, a two step release switch 18 having 1st and 2nd switch positions, a zoom switch 19 having two contact points for designating zoom operation switching to a wide angle direction or a telephoto direction, a zoom state detection switch or zoom encoder 20 of a focal length detection means for detecting a zooming state of the lens barrel 2 (i.e., the position of the lens barrel 2), a shutter drive section (not shown) serving as an electric control element for camera control, a film feed drive section, and the like.

The CPU 12 incorporates, in addition to the control section of the camera, a non-operation continuation time counter section 12a which clocks the time period during which none of the operation switches are operated while the camera is in a photographable state (referred to hereinafter as the "non-operation time period"), a clocking output decision section 12b (which is a clocking output decision means) for comparing the output of counter section 12a with pieces of reference decision time information, and a lens frame control section 12c which is a control means for instructing the motor drivers 13 and 15 to withdraw the lens frames of the lens barrel 2 to the collapsed or storage position.

The operation switches which, when operated, interrupt the clocking of the non-operation time period are the release switch 18, the zoom switch 19, and the like. The pieces of reference decision time information are stored in a memory section (a reference time storage means) incorporated in the CPU 12. A zoom encoder may be also applied to the zoom state detection switch 20.

In addition, the pieces of reference decision time information are a predetermined first reference time period TA and a predetermined second reference time period TB which is longer than the time period TA. For example, the first reference time period TA is set to be one minute, and the second reference time period TB is set to be two minutes. The values of the reference time periods TA and TB may be set to the specifications of each camera.

In the camera according to this embodiment, when the main switch 17 is turned on, the lens frame of the lens barrel 2 moves from the storage position to the wide angle position P2B (which places the camera in a photographic preparation state) to make it possible to perform a photographic operation. Thereafter, the lens frame is extended to the intermediate zoom position P2C or the telephoto position P2D, depending on the operation of the zoom switch 19. In the photographable state, a non-operation time period T0 during which the operation switch is not operated is clocked. While the non-operation time period T0 continues, the focal length of the lens barrel 2 is not varied.

When the lens barrel is in the telephoto position and the non-operation time period T0 exceeds the first reference time period TA, the lens barrel 2 is withdrawn to the storage position. When the lens barrel 2 is extended further than the wide angle position and the non-operation time period T0 is larger than the second reference time period TB, the lens barrel 2 is withdrawn into the storage position, so that the respective lens frames are protected.

Figure 3:
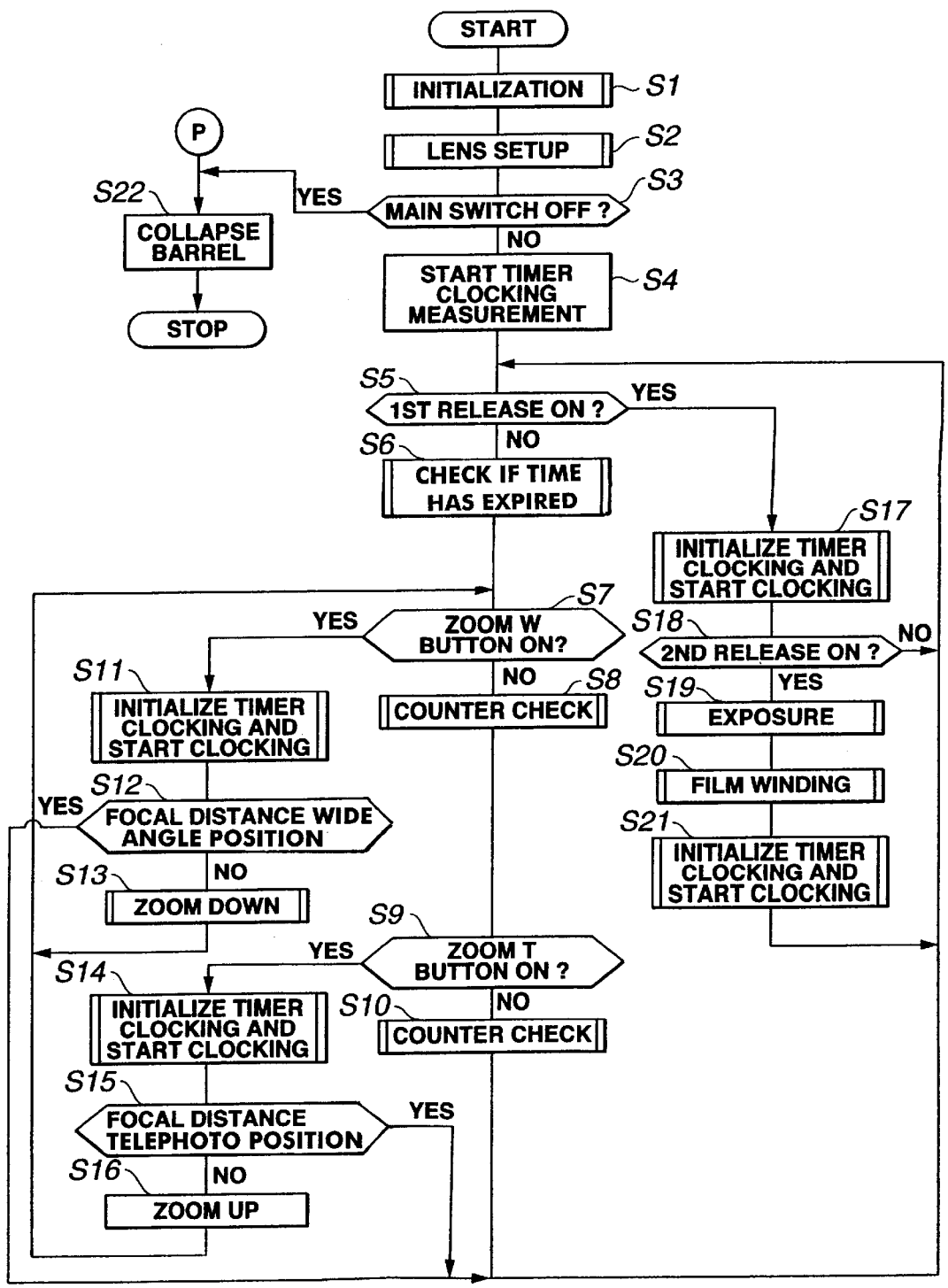
FIG. 3 is a flow chart of a photographic sequence serving as a main routine in the camera according to the first embodiment.
Figure 4:
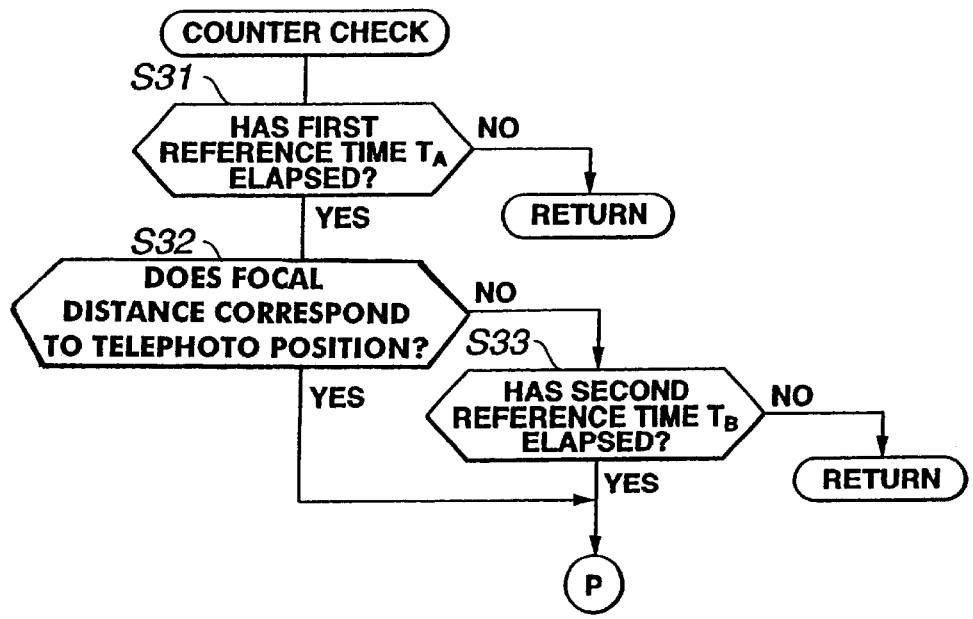
FIG. 4 is a flow chart of a counter check process of a subroutine called in the main routine in the camera according to the first embodiment.

The photographic sequence of the camera including the automatic withdrawing operation described above will be described below with reference to the flow charts shown in FIGS. 3 and 4. FIG. 3 shows a flow chart of a photographic sequence which is a main routine, and FIG. 4 shows a flow chart of a counter check of a subroutine.

The photographic sequence is started by turning on the main switch 17. Initialization is performed in step S1, the setup motor 14 is driven in step S2 to move the lens barrel 2 from the storage position P2A to the wide angle position P2B. This is a photographic preparation state (photographic initial state), and the photographic lens is located at the photographic preparation position (photographic initial position). The ON state of the main switch 17 is confirmed in step S3, and the CPU 12 shifts to step S4. If the main switch 17 is set in an OFF state, the CPU 12 shifts to step S22, and the setup motor 14 is driven to collapse the lens barrel 2 into the storage position P2A. Thereafter, the CPU 12 is set in an operation stop state (HALT state in mnemonic code) by itself to set the camera in an OFF state.

In step S22, if the lens barrel 2 is extended past the wide angle position P2B, the zoom motor 16 is driven prior to collapsing drive performed by the setup motor 14 to withdraw the lens barrel 2 to the wide angle position P2B.

In step S4, clocking of the non-operation time counter section 12a of the CPU 12 is started (clocking means and non-operation state detection means). The CPU 12 shifts to step S5 to check the ON/OFF state of the 1st release of the release switch 18. If the 1st release is ON, the CPU 12 jumps to step S17. If the 1st release is OFF, the CPU 12 shifts to step S6 to call a counter check process (FIG. 4) of a subroutine for checking clocking of the counter section 12a.

The counter check process is shown in FIG. 4. In step S31, it is checked whether the clocked time period T0 of the non-operation time counter section 12a exceeds the first reference time period TA (clocking output decision means). If the clocked time period T0 does not exceed the first reference time period TA, the CPU 12 returns to the main routine of FIG. 3. If the clocked time period T0 exceeds the reference time period, the CPU 12 shifts to step S32 to check the zoom position of the lens barrel 2 and thereby determine the focal length of the lens. If the lens barrel 2 is extended to the telephoto position P2D, the CPU 12 shifts to step S22 of the main routine to drive the setup motor 14 and the lens barrel 2 is withdrawn to the storage position P2A. When the lens barrel 2 is not extended to the telephoto position P2D, the CPU 12 shifts to step S33.

In step S33, it is determined whether the clocked time period T0 of the non-operation time counter section 12a exceeds the second reference time period TB (clocking output decision means). If the clocked time period T0 does not exceed the reference time period TB, the CPU 12 returns to the main routine. If the clocked time period T0 exceeds the reference time period TB, the CPU 12 shifts to step S22 of the main routine to drive the zoom motor 16 or the setup motor 14, and the lens barrel 2 is withdrawn to the storage position P2A.

After the counter check process of the subroutine is performed in step S6 described above, the CPU 12 shifts to step S7 to check whether a wide angle direction designation switch (zoom wide switch) of the zoom switch 19 is operated. If the switch is set in an ON state, the CPU 12 shifts to step S11. If the switch is set in an OFF state, the CPU 12 shifts to step S8.

When the CPU 12 shifts to step 11, the non-operation time counter section 12a of the CPU 12 is reset (initialized) to start clocking (clocking means and non-operation state detection means). It is checked in step S12 whether the focal length of the lens barrel 2 corresponds to the wide angle position or not. If so, the CPU 12 returns to step S5 without driving the zoom motor 16. If not, the CPU 12 shifts to step S13 to drive the zoom motor 16, and a predetermined zoom down operation is executed. Thereafter, the CPU 12 returns to step S7.

When the CPU 12 shifts to step S8, the counter check process (FIG. 4) of the subroutine is repeated.

Subsequently, it is checked in step S9 whether the telephoto direction designation switch (zoom towards telephoto switch) of the zoom switch 19 is operated or not. If the switch is an ON state, the CPU 12 shifts to step S14, If the switch is an OFF state, the CPU 12 shifts to step S10.

In step S14, the non-operation time counter section 12a of the CPU 12 is reset (initialized) to start clocking (clocking means and non-operation state detection means). It is checked in step S15 whether the lens barrel 2 is in the telephoto position or not. If it is, the CPU 12 returns to step S5 without driving the zoom motor 16. If it is not, the CPU 12 shifts to step S16 to drive the zoom motor 16, and a predetermined zoom up operation is executed. Thereafter, the CPU 12 returns to step S7.

When the CPU 12 shifts to step S10 described above, the countercheck process (see FIG. 4) of the subroutine is repeated.

After the 1st switch of the release switch 18 is operated, when the CPU 12 jumps to step S17, the non-operation time counter section 12a of the CPU 12 is reset (initialized) to start clocking (clocking means and non-operation state detection means). In step S18, the CPU 12 checks the ON/OFF state of the 2nd release of the release switch 18. If the 2nd release is OFF, the CPU 12 returns to step S5. If the 2nd release is ON, the CPU 12 shifts to step S19 to release the shutter and to execute exposure. A film is wound in step S20, the non-operation continuation time counter section 12a is initialized in step S21 to start clocking (clocking means and non-operation state detection means), and the CPU 12 returns to step S5 described above.

FIG. 12 is a diagram showing reciprocating operation states of the lens barrel 2 when a non-operation time period continues while the lens barrel is in one of the photographic positions of the camera according to the first embodiment. In FIG. 12 and FIGS. 13 to 18 (to be described later), a black circle representing a focal length of a photographic lens (lens barrel 2) indicates that the focal length includes an expressed focal length, and a white circle indicates that the focal length excludes an expressed focal length.

When the initial focal length of the lens barrel 2 corresponds to the telephoto position, and the non-operation time period reaches the first reference time period TA, the lens barrel 2 is withdrawn to the storage position.

When the lens barrel 2 is located in a range from just past the telephoto position up to and including the wide angle position, and when the non-operation time reaches a reference time period TB, the lens barrel 2 is withdrawn to the storage position.

According to the camera according to the first embodiment described above, when the lens barrel 2 is extended to the telephoto position, the amounts of extension of the lens frames are so large that the lens frames can be easily damaged by an external force. For this reason, even though the clocked time period T0 of the operation switch is relatively short, the lens barrel 2 is automatically collapsed to protect the lens frames from mechanical defects. At the same time, when the amounts of extension are large, even though leakage of light easily occurs, the lens frames can be effectively protected from the mechanical defects.

On the other hand, when the lens is an intermediate (standard) or wide angle zoom position, the amount of extension of the lens frame is small. For this reason, the lens barrel 2 is collapsed only when the non-operation time period T0 of the operation switch continues for a relatively long time, so that a user rarely misses the moment for a good picture. In addition, although the lens frames are extended for a relatively long time, since the amount of extension of the lens frames are small, leakage of light rarely occurs, and any troubles do not occur.

Second Embodiment

A camera according to the second embodiment of the present invention will be described below.

The camera according to this embodiment has substantially the same configuration as that of the constituent members shown in FIGS. 1A to 1D and FIG. 2 of the camera according to the first embodiment. The different points of these cameras are as follows. That is, the number of pieces of reference decision time information stored in a memory section incorporated in a CPU are three, the three pieces of reference decision time information are compared with a clocked non-operation continuation time period T0 in which an operation switch is not operated to make a decision, and three types of withdrawing controls of a lens barrel are performed. Therefore, the same reference numerals as in the first embodiment denote the same parts in the second embodiment, and only different control processes will be described below.

In the camera according to this embodiment, the three pieces of reference decision time information stored in a memory section of the CPU 12 are defined as a predetermined first reference time period TC, a predetermined second reference time period TD, and a predetermined third reference time period TE, respectively. The reference time periods satisfy the relationship TC<TD<TE. For example, the time period TC is set to be 1 minute, the time period TD is set to be 2 minutes, and the time period TE is set to be 3 minutes.

When a non-operation time period T0 which is clocked by a non-operation time counter section 12a in a CPU 12 and in which the operation switches of the release switch 18 and the zoom switch 19 are not operated is longer than the reference time periods, it is decided, according to the extended state (zoom state) of a lens barrel 2, whether the lens barrel 2 is in the storage position or not, and a collapsing drive is executed.

Figure 5:
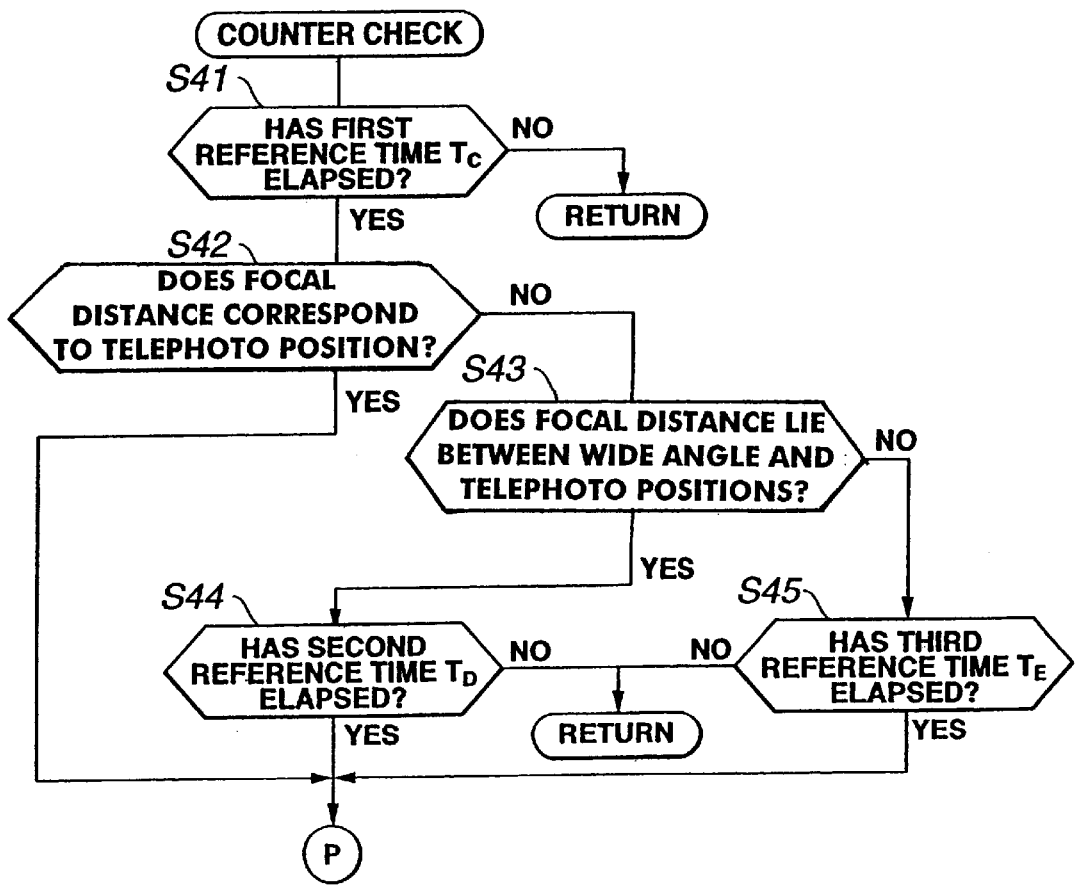
FIG. 5 is a flow chart of a counter check process of a subroutine called in a main routine in a camera according to the second embodiment of the present invention.

FIG. 5 is a flow chart of a counter check process of a subroutine called in a photographic sequence (see FIG. 3) in the camera of this embodiment.

The photographic sequence itself in the camera of the embodiment includes the same processes as those shown in FIG. 3 in the first embodiment. However, the counter check process of the subroutines called in steps S6, S8, and S10 is different from that in the second embodiment. The flow chart of the different counter check process is shown in FIG. 5.

In the counter check process, it is checked in step S41 whether the clocked time period T0 of the non-operation time counter section 12a exceeds the first reference time period TC (clocking output decision means). If the clocked time period T0 does not exceed the reference time period TC, the CPU 12 returns to the main routine. If the clocked time period T0 exceeds the reference time period TC, the CPU 12 shifts to step S42.

In step S42, the extended state of the lens barrel 2 is checked by the focal length detection means. When the lens barrel 2 is in the telephoto position P2D, the CPU 12 shifts to step S22 (FIG. 3) of the main routine and the zoom motor 16 and the setup motor 14 are driven to withdraw the lens barrel 2 into the storage position P2A. When the lens barrel 2 is not in the telephoto position P2D, the CPU 12 shifts to step S43.

In step S43, the extended state of the lens barrel 2 is checked by the focal length detection means. When the lens barrel 2 is extended beyond the wide angle position P2B, the CPU 12 shifts to step S44. When the lens barrel 2 is located at the wide angle position P2B, the CPU 12 shifts to step S45.

In step S44, it is checked whether the clocked time period T0 of the non-operation time counter section 12a exceeds the second reference time period TD by the clocking output decision means. If the clocked time period T0 does not exceed the second reference time period TD, the CPU 12 returns to the main routine. If the clocked time period T0 exceeds the second reference time period TD, the CPU 12 shifts to step S22 of the main routine, and the zoom motor 16 and the setup motor 14 are driven to withdraw the lens barrel 2 to the storage position P2A.

In step S45 described above, it is checked whether the clocked time period T0 of the non-operation time counter section 12a exceeds the third reference time TE by the clocking output decision means. If the clocked time period T0 does not exceed the third reference time period TE, the CPU 12 returns to the main routine. If the clocked time period T0 exceeds the third reference time period TE, the CPU 12 shifts to step S22 of the main routine and the setup motor 14 is driven to withdraw the lens barrel 2 to the storage position P2A.

FIG. 13 is a diagram showing reciprocating operation states of the lens barrel 2 when a non-operation time continues in focal length states in the camera according to the second embodiment.

When the lens barrel 2 is initially in the telephoto state, and the non-operation time period reaches the first reference time period TC, the lens barrel 2 is withdrawn to the storage position.

When the lens barrel 2 is between the telephoto and wide angle positions and the non-operation time period reaches the reference time period TD, the lens barrel 2 is withdrawn to the storage position.

When the lens barrel 2 is in the wide angle position and the non-operation time period reaches the reference time period TE, the lens barrel 2 is withdrawn to the storage position.

According to the camera of the second embodiment described above, the same advantage as that obtained in the camera according to the first embodiment. In particular, three pieces of time information are stored in the memory section as pieces of reference decision time information to be compared with the non-operation time period T0 during which the operation switch is not operated. The pieces of time information correspond, respectively, to three types of extended states of the lens barrel, and the storage operation is precisely controlled.

More specifically, when the lens barrel 2 is located in the telephoto position, the lens frames are easily damaged and the possibility of leakage of light from a mechanical damage is high. To avoid this problem, the lens barrel 2 is withdrawn to the storage position when a relatively short time period defined by the first reference time period TC expires (without an operation switch being operated). When the lens barrel 2 is located between the telephoto and wide angle positions, the lens barrel 2 is withdrawn into the storage position when an intermediate timing period defined by the second reference time TD expires. When the lens barrel 2 is located at the wide angle position, the lens frames are not easily damaged, and the possibility of leakage of light is low. For this reason, the lens barrel 2 is withdrawn into the storage position only after a relatively large non-operation continuation time period defined by the third reference time period TE. In the camera according to this embodiment, protection of the lens frames and prevention of leakage of light are more effectively performed by the above collapsing control.

As a lens barrel reciprocating drive means according to the embodiment described above, two motors, i.e., the setup motor 14 and the zoom motor 16 are used. Alternatively, a single drive motor may be applied as the two motors, so that the drive motor can be selectively driven.

In the first and second embodiments described above, in the counter check processes of the subroutines shown in FIGS. 4 and 5, if it is detected that the non-operation time period T0 exceeds the respective predetermined reference time periods while the lens barrel 2 is in an extended state, the CPU 12 returns to step S22 of the main routine of the photographic sequence in FIG. 3, and the zoom motor 16 and the setup motor 14 are driven to control the lens barrel 2 such that the lens barrel 2 is withdrawn to the storage position P2A. However, after the lens barrel 2 is withdrawn to the storage position, when the camera must be set in a photographic state again, the lens barrel 2 is temporarily extended to the wide angle position P2B in the photographic preparation state. Thereafter, the lens barrel 2 must be extended to a desired zoom position, time required to perform these operations becomes long.

Therefore, as a modification of the control method, the following method can also be provided. That is, after a predetermined time has elapsed, when the CPU 12 returns to the main routine, the lens barrel 2 is withdrawn not to the storage position P2A, but to the wide angle position P2B (which operates as a photographic preparation position). More specifically, in this modification, after the counter check of the subroutine is called, if it is detected that the non-operation continuation time period T0 exceeds the predetermined reference time periods, the lens barrel 2 is withdrawn to the wide angle position P2B, and the amounts of extension of the lens frames are controlled to be kept small.

According to the camera to which this modification is applied, if the non-operation time period exceeds a plurality of predetermined reference time periods corresponding to the lens extended states, the lens barrel 2 is withdrawn to the wide angle position P2B, so that the lens frames are protected from external force, and, at the same time, the camera can shift to the next photographic operation.

Third Embodiment

A camera according to the third embodiment of the present invention will be described below.

The camera according to this embodiment has substantially the same configuration as the configuration shown in FIGS. 1A to 1D and FIG. 2 with respect to the cameras according to the first and second embodiments, and performs the same processes as those in the photographic sequence (main routine) shown in the flow chart in FIG. 3. However, a counter check process of a subroutine different from the sub-routine of the second embodiment. Pieces of reference decision time information are compared with a non-operation photographic state continuation time period T0 to decide the non-operation photographic time period T0, and the lens barrel is withdrawn in three different ways.

As in the second embodiment, three pieces of reference decision time information are applied as pieces of reference decision time information stored in a memory section incorporated in a CPU. The three pieces of reference decision time information are defined as a predetermined first reference time period TC, a second reference time period TD, and a third reference time period TE, respectively. The reference time periods satisfy the relationship TC<TD<TE. More specifically, for example, the time period TC is set to be 1 minute, the time period TD is set to be 2 minutes, and the time period TE is set to be 3 minutes. The same reference numerals as in FIGS. 1 and 2 denote the same parts in the third embodiment, and the processes of the different sub-routine will be described below.

Figure 6:
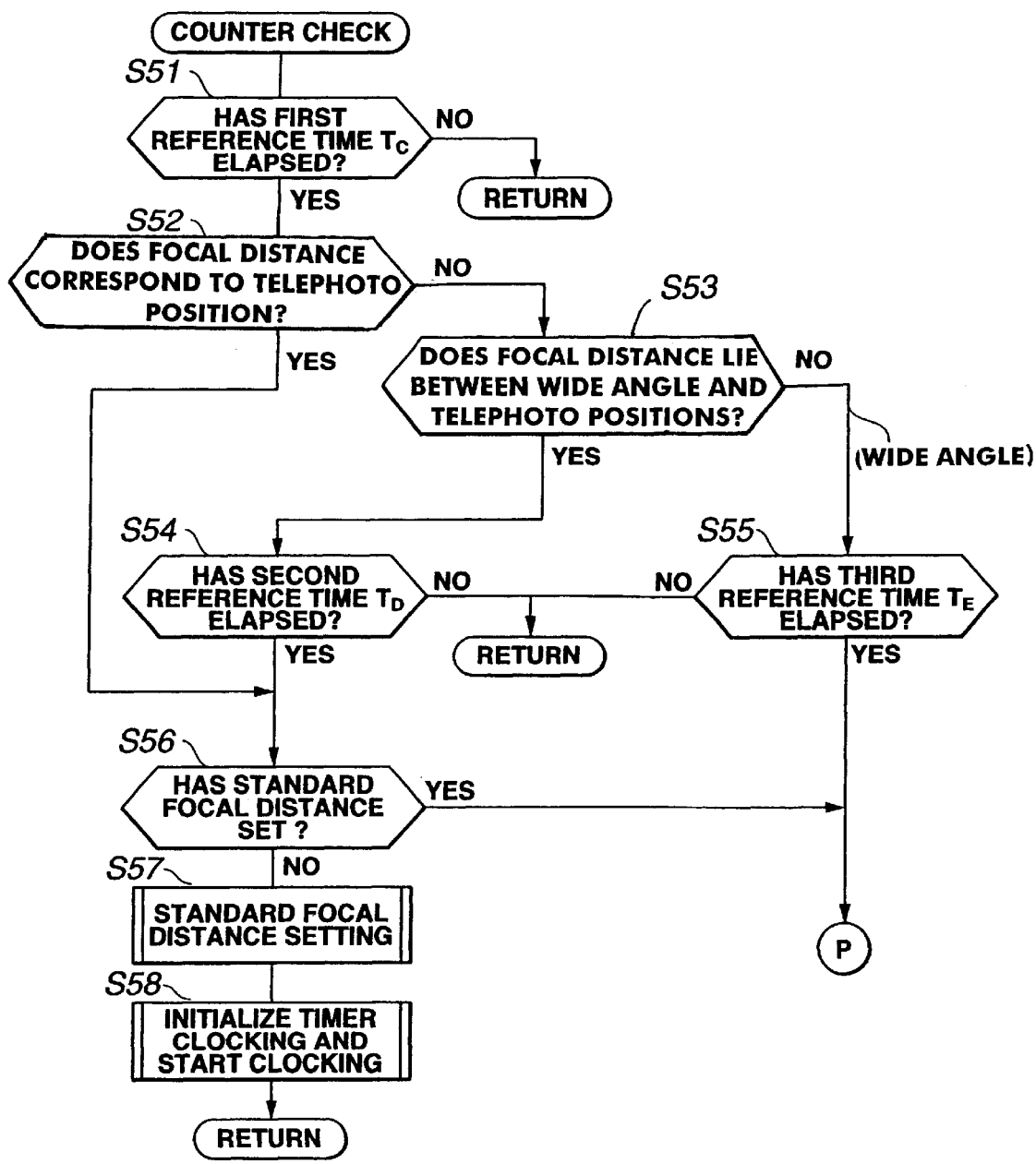
FIG. 6 is a flow chart of a counter check process of a subroutine called in a main routine in a camera according to the third embodiment of the present invention.

FIG. 6 is a flow chart of a counter check process of a subroutine called in steps S6, S8, and S10 (see FIG. 3) of a photographic sequence (main routine) in the camera according to the third embodiment.

In the counter check process, as the process in steps S51 to S54, the same process as that in steps S41 to S44 in the second embodiment is performed. More specifically, it is checked in step S51 whether the counted time period T0 of the non-operation continuation time counter section 12a exceeds the first reference time period TC by the clocking output decision means. If the clocked time T0 does not exceed the reference time period TC, the CPU 12 returns to the main routine. If the clocked time period T0 exceeds the reference time period TC, the CPU 12 shifts to step S52.

In step S52, the extended state of the lens barrel 2 is checked by the focal length detection means. When the lens barrel 2 is located at the telephoto position P2D, the CPU 12 shifts to step S56 (to be described later). When the lens barrel 2 is in the telephoto position P2D, the CPU 12 shifts to step S53.

In step S53, the position of the lens barrel 2 is checked by the focal length detection means. When the lens barrel 2 is extended between the wide angle position P2B and the telephoto position P2D, the CPU 12 shifts to step S54. When the lens barrel 2 is not located between the wide angle and telephoto positions, i.e., the lens barrel 2 is located at the wide angle position P2B, the CPU 12 shifts to step S55.

In step S54 described above, it is checked whether the clocked time period T0 of the non-operation time counter section 12a exceeds the second reference time period T0 by the clocking output decision means. If the clocking time period T0 does not exceed the reference time period TD, the CPU 12 returns to the main routine. If the clocked time period T0 exceeds the reference time period TD, the CPU 12 shifts to step S56.

In step S55 described above, it is checked whether the clocked time period T0 of the non-operation time counter section 12a exceeds the third reference time period TE by the clocking output decision means. If the clocked time period T0 does not exceed the third reference time period TE, the CPU 12 returns to the main routine. If the clocked time period T0 exceeds the reference time period TE, the CPU 12 shifts to step S22 of the main routine, and the setup motor 14 is driven to withdraw the lens barrel 2 to the storage position P2A.

In the step S56 described above, it is checked whether the lens barrel 2 is located in the intermediate zoom position P2C by the focal length detection means. If so, the CPU 12 shifts to step S22 of the main routine, and the zoom motor 16 and the setup motor 14 are driven to withdraw the lens barrel 2 to the storage position P2A. If the lens barrel 2 is not in the intermediate zoom position P2C, the CPU 12 shifts to step S57, and the zoom motor 16 is driven to execute a standard focal length setting process. More specifically, the lens barrel 2 is moved to the intermediate zoom position P2C. The non-operation time counter section 12a of the CPU 12 is reset (initialized) in step S58 to start clocking (clocking means and non-operation state detection means). Thereafter, the CPU 12 returns to the main routine.

FIG. 14 is a diagram showing reciprocating operation states of the lens barrel 2 when a non-operation time continues in focal length states in the camera according to the third embodiment.

When the lens barrel 2 initially in a telephoto state and the non-operation continuation time period reaches the reference time period TC, the lens barrel 2 is temporarily withdrawn to an intermediate zoom position (the standard zoom position). When thereafter, the non-operation continuation time period exceeds the reference time period TD, the lens barrel 2 is withdrawn to the storage position.

When the lens barrel 2 is initially between the telephoto and wide angle positions, but is not in the standard focal length position, and the non-operation time period reaches the second reference time period TD, the lens barrel 2 temporarily moves to an intermediate zoom position (standard focal length). Thereafter, when the non-operation continuation time exceeds the reference time period TD, the lens barrel 2 is withdrawn to the storage position.

When the lens barrel 2 is initially at either the standard focal length position or the wide angle position, and when the non-operation time period reaches the reference time period TD or TE, respectively, the lens barrel 2 is withdrawn to the storage position.

This embodiment achieves the same advantage as that obtained in the cameras according to the first and second embodiments. In particular, when the lens barrel 2 is in the telephoto or intermediate zoom positions after the predetermined non-operation times have elapsed, the lens barrel 2 is temporarily kept at the intermediate zoom position P2C and the lens barrel 2 is caused to wait for a predetermined time.

As described above, according to this embodiment, when the lens barrel is caused to wait, the camera can immediately shift to a photographic operation for at least the waiting time, and a user rarely misses the moment for a good picture. On the other hand, the lens barrel 2 is at the wide angle position, a very long time is not required to extend the lens barrel 2 from the storage position to the wide angle position. For this reason, control is performed such that the lens barrel 2 is placed in the storage position immediately after the predetermined non-operation time has elapsed, and the lens barrel 2 is protected as safe as possible.

Fourth Embodiment

A camera according to the fourth embodiment of the present invention will be described below.

The camera according to this embodiment has substantially the same configuration as the configuration shown in FIGS. 1A to 1D and FIG. 2 of the cameras according to the first and second embodiments, and performs the same processes as those in the photographic sequence (main routine) shown in the flow chart in FIG. 3. However, the fourth embodiment is different from the second embodiment in the processes performed after the first and second reference decision times have elapsed in the counter check process of the subroutine. In this embodiment, as three pieces of reference decision time information, a predetermined first reference time period TC, a second reference time period TD, and a third reference time period TE are employed.

Figure 7:
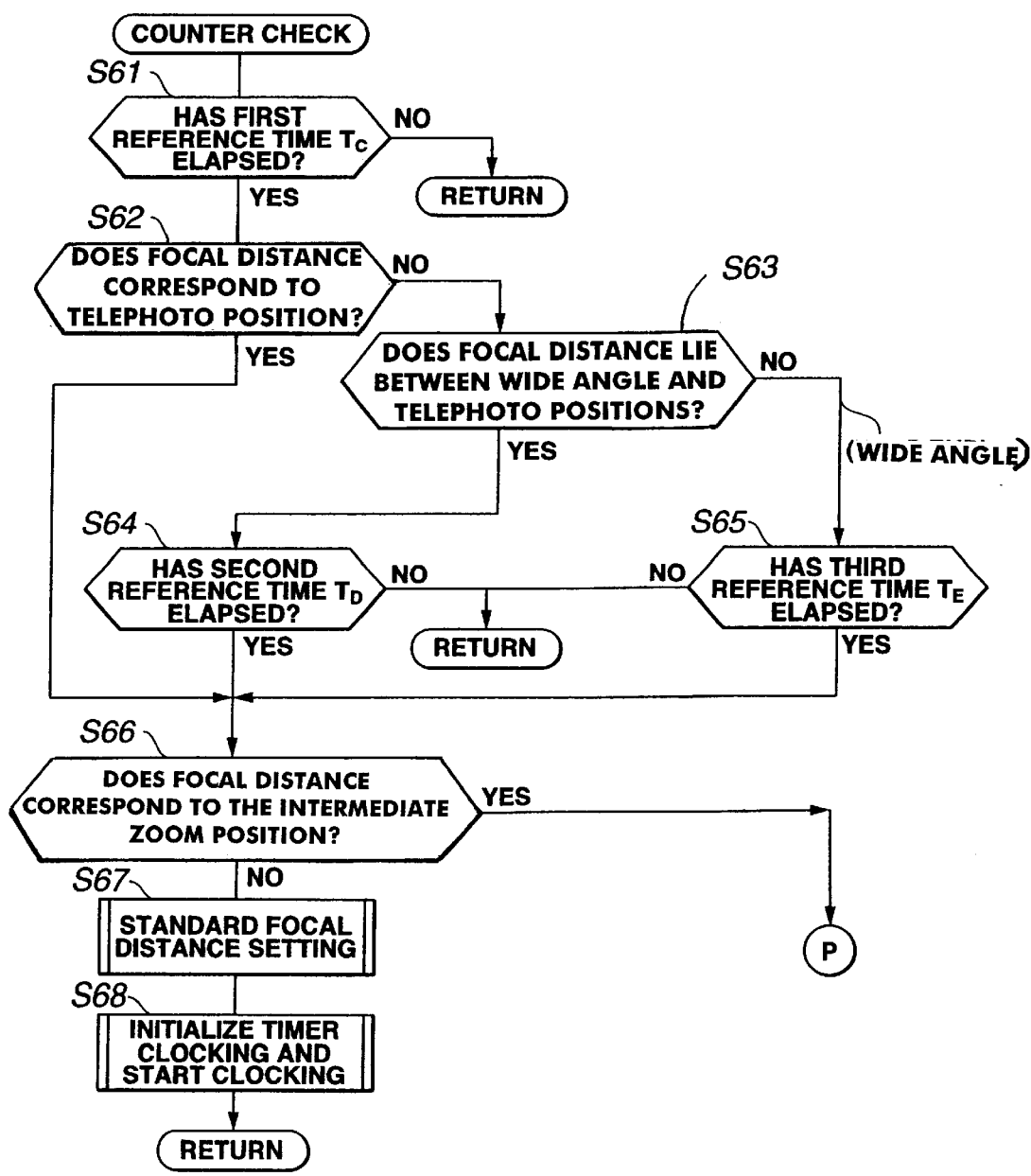
FIG. 7 is a flow chart of a counter check process of a subroutine called in a main routine in a camera according to the fourth embodiment of the present invention.

FIG. 7 is a flow chart of a counter check process of a subroutine called in steps S6, S8, and S10 (see FIG. 3) of a photographic sequence (main routine) in the camera according to the fourth embodiment.

The processes in steps S61 to S64 in the counter check process are the same as the processes in steps S41 to S44 in the second embodiment. More specifically, when the lens barrel 2 is at the telephoto position or is located between the telephoto and wide angle positions and the non-operation time period exceeds first and second reference time periods TC and TD, respectively, the CPU 12 shifts to step S66. When it is detected by checking the extended state of the lens barrel 2 in step S63 that the lens barrel 2 is extended between the wide angle and the telephoto positions, the CPU 12 shifts to step S66. When it is determined that the lens barrel 2 is located at the wide angle position P2B, the CPU 12 shifts to step S65.

In step S65, it is checked whether the clocked time period T0 of the non-operation time counter section 12a exceeds the third reference time period TE by the clocking output decision means. If the clocked time period T0 does not exceed the third reference time period, the CPU 12 returns to the main routine. If the clocked time period T0 exceeds the third reference time period TE, the CPU 12 shifts to step S66.

In the step S66 described above, it is checked whether the lens barrel 2 is set at the intermediate zoom position P2C by the focal length detection means. If so, the CPU 12 shifts to step S22 of the main routine, and the zoom motor 16 and the setup motor 14 are driven to withdraw the lens barrel 2 to the collapse position P2A. If the lens barrel 2 is not set at the intermediate zoom position P2C, the CPU 12 shifts to step S67, and the zoom motor 16 is driven to execute a standard focal length setting process. More specifically, the lens barrel 2 is moved to the intermediate zoom position P2C. The non-operation continuation time counter section 12a of the CPU 12 is reset (initialized) in step 969 to start clocking (clocking means and non-operation state detection means). Thereafter, the CPU 12 returns to the main routine.

FIG. 15 is a diagram showing reciprocating operation states of the lens barrel 2 when a non-operation time continues in focal length states in the camera according to the fourth embodiment.

When the lens barrel 2 is initially at the telephoto position and the non-operation continuation time reaches the reference time TC, the lens barrel 2 is temporarily withdrawn to the intermediate zoom position (standard focal length). Thereafter, when the non-operation continuation time exceeds the reference time TD, the lens barrel 2 is withdrawn to the storage position.

When the lens barrel 2 is between the telephoto and wide angle positions but is not in the intermediate zoom position, and the non-operation time reaches the second reference time TD, the lens barrel 2 temporarily moves to the intermediate zoom position (standard focal length). Depending on the initial position of the lens barrel 2, it may be withdrawn or extended to this position. Thereafter, when the non-operation time exceeds the reference time TD, the lens barrel 2 is withdrawn to the storage position.

When the initial position of the lens barrel 2 is the intermediate position (standard focal length) and the non-operation time reaches the reference time TD, the lens barrel 2 is withdrawn to the storage position.

When the lens barrel 2 is initially at the wide angle position and the non-operation time reaches the reference time TE, the lens barrel 2 is temporarily moved to the intermediate zoom position (standard focal length). Thereafter, when the non-operation continuation time exceeds the reference time TD, the lens barrel 2 is withdrawn to the storage position.

According to the camera of the fourth embodiment described above, the same advantage as that obtained in the cameras according to the first and second embodiments. In particular, when the lens barrel 2 is in any zoom position other than the intermediate position P2C, it will be moved into the intermediate position after predetermined non-operation times have elapsed. The lens barrel 2 will then be moved to the storage position P2A after a further predetermined non-operation time has elapsed. Therefore, the camera can immediately shift to a photographic operation from the standard focal length state for at least the predetermined time, and a user rarely misses the moment for a good picture.

Fifth Embodiment

A camera according to the fifth embodiment of the present invention will be described below.

The camera according to this embodiment has substantially the same configuration as the configuration shown in FIGS. 1A to 1D and FIG. 2 of the cameras according to the first and second embodiments, and performs the same processes as those in the photographic sequence (main routine) shown in the flow chart in FIG. 3. However, the fifth embodiment is different from the second embodiment in the processes performed after the first reference decision time except for the telephoto position has elapsed in the counter check process of the subroutine called in the main routine described above. Also in the camera of this embodiment, as three pieces of reference decision time information, as in the second embodiment, a predetermined first reference time period TC, a second reference time period TD, and a third reference time period TE are employed.

Figure 8:
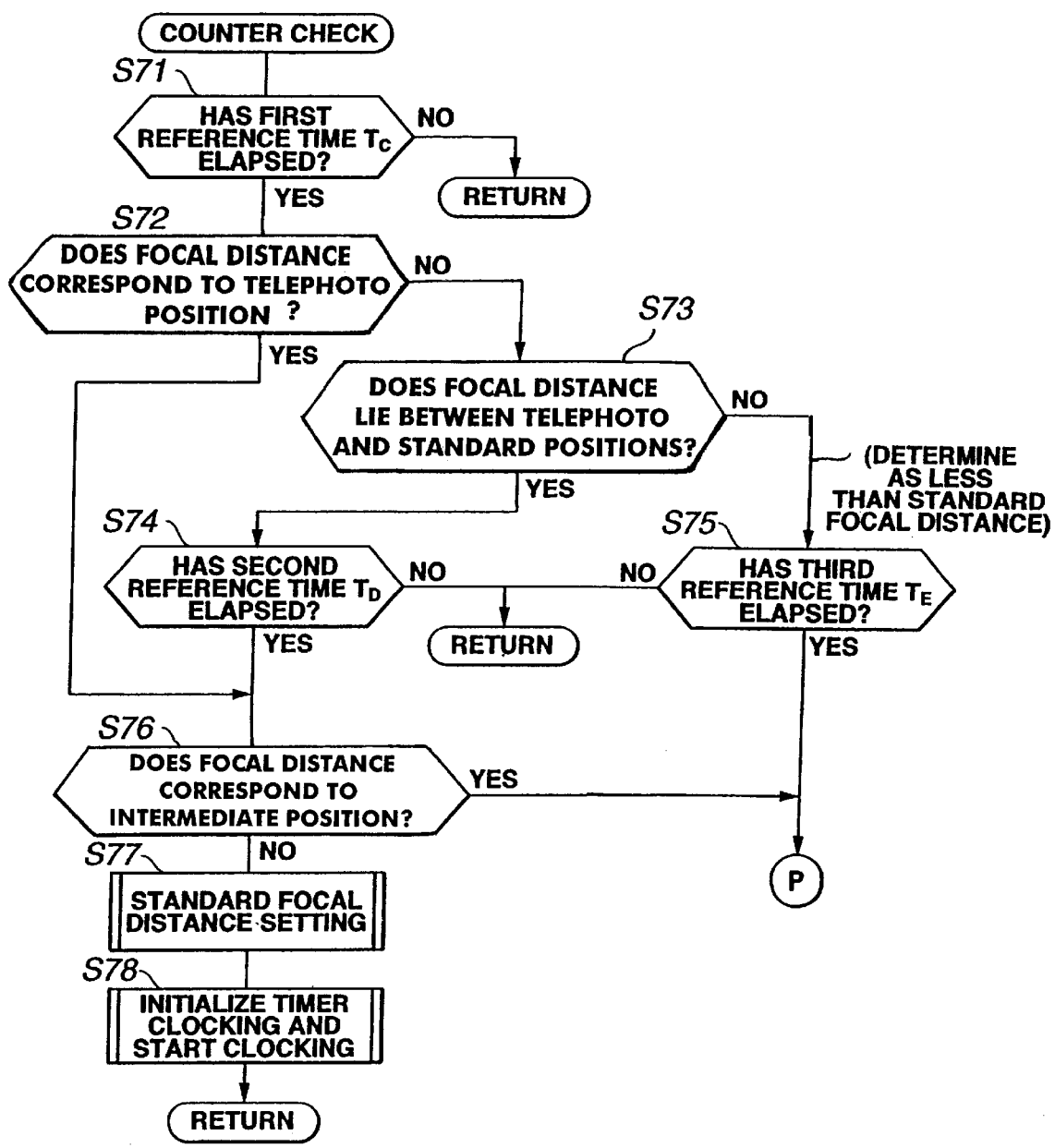
FIG. 8 is a flow chart of a counter check process of a subroutine called in a main routine in a camera according to the fifth embodiment of the present invention.

FIG. 8 is a flow chart of a counter check process of a subroutine called in steps S6, S8, and S10 (see FIG. 3) of a photographic sequence (main routine) in the camera according to the fifth embodiment.

The processes in the first step S71 and step S72 in the counter check process are the same as the processes in steps S41 and S42 in the second embodiment. More specifically, when a non-operation time exceeds the first reference time TC and the lens barrel 2 is located at the telephoto position, the CPU 12 shifts to step S76. When the lens barrel 2 is not located at the telephoto position, the CPU 12 shifts to step S73.

In step S73, the extended state of the lens barrel 2 is checked by the focal length detection means. When the lens barrel 2 is extended between the telephoto position P2D and the intermediate position P2C, the CPU 12 shifts to step S74. When the lens barrel 2 is not extended between the telephoto position and the intermediate position, i.e., the lens barrel 2 is located before the intermediate position P2C, the CPU 12 shifts to step S75.

In step S74 described above, it is checked whether the clocked time period T0 of the non-operation time counter section 12a exceeds the second reference time period TD by the clocking output decision means, If the clocking time period T0 does not exceed the reference time period TD, the CPU 12 returns to the main routine. If the clocked time period T0 exceeds the reference time period TD, the CPU 12 shifts to step S76.

In step S75 described above, it is checked whether the clocked time period T0 of the non-operation continuation time counter section 12a exceeds the third reference time period TE by the clocking output decision means. If the clocked time period T0 does not exceed the third reference time period TE, the CPU 12 returns to the main routine. If the clocked time period T0 exceeds the third reference time period TE, the CPU 12 shifts to step S22 of the main routine, and the setup motor 14 is driven to withdraw the lens barrel 2 to the storage position P2A.

In the step S76 described above, it is checked whether the lens barrel 2 is set at a standard focal length (corresponding to the intermediate zoom position P2C). If so, the CPU 12 shifts to step S22 of the main routine, and the zoom motor 16 and the setup motor 14 are driven to withdraw the lens barrel 2 to the storage position P2A. If not, the CPU 12 shifts to step S77, and the zoom motor 16 is driven to execute a standard focal length setting process. More specifically, the lens barrel 2 is withdrawn to the intermediate zoom position P2C. The non-operation continuation time counter section 12a of the CPU 12 is reset (initialized) in step S78 to start clocking (clocking means and non-operation state detection means). Thereafter, the CPU 12 returns to the main routine.

FIG. 16 is a diagram showing reciprocating operation states of the lens barrel 2 when a non-operation time continues in focal length states in the camera according to the fifth embodiment.

When the lens barrel 2 is initially in the telephoto position and the non-operation time period reaches the reference time period TC, the lens barrel 2 is temporarily withdrawn to an intermediate zoom position (standard focal length). Thereafter, when the non-operation time period exceeds the reference time period TD, the lens barrel 2 is withdrawn to the storage position.

When the lens barrel 2 is between the telephoto position and the intermediate zoom position (standard focal length) and the non-operation time period reaches the reference time period TD, the lens barrel 2 is temporarily withdrawn to an intermediate zoom position (standard focal length). Thereafter, when the non-operation continuation time period exceeds the reference time period TD, the lens barrel 2 is withdrawn to the storage position.

When the lens barrel 2 is initially at the intermediate zoom position (standard focal length) and the non-operation time period reaches the reference time period TD, the lens barrel 2 is withdrawn to the storage position.

When the lens barrel 2 is between the intermediate zoom position and the wide angle position and when the non-operation time period reaches the reference time period TE, the lens barrel 2 is withdrawn to the collapse position.

According to the camera of the fifth embodiment, the same advantage as that obtained in the cameras according to the first and second embodiments. In particular, when the lens barrel 2 is located before the intermediate position P2C (i.e., has a focal length smaller than the standard focal length) and a predetermined non-operation time period has elapsed, the lens barrel 2 is collapsed into the storage position. However, when the lens barrel 2 is located at a position beyond the intermediate (standard focal length) position and a predetermined non-operation continuation time period has elapsed, the lens barrel 2 is temporarily moved to the intermediate (standard focal length) position until a further predetermined non-operation time period has elapsed at which time it is collapsed into the storage position. Therefore, when the lens barrel 2 is located on the telephoto side with respect to the intermediate position P2C, even though the predetermined time has elapsed, the lens barrel 2 is not immediately withdrawn to the storage position P2A. Rather, the lens barrel 2 is temporarily caused to wait at the intermediate position P2C, so that the camera can immediately shift to a photographic state when it is the moment for a good picture.

Sixth Embodiment

A camera according to the sixth embodiment of the present invention will be described below.

The camera according to this embodiment has substantially the same configuration as the configuration shown in FIGS. 1A to 1D and FIG. 2 of the cameras according to the first and second embodiments, and performs the same processes as those in the photographic sequence (main routine) shown in the flow chart in FIG. 3. However, the sixth embodiment is different from the fifth embodiment in the counter check processes of the subroutine performed when a lens barrel is located in a position other than the telephoto position and located at a position having a focal length smaller than a standard focal length. Also in the camera of this embodiment, as three pieces of reference decision time information, as in the second embodiment, a predetermined first reference time period TC, a second reference time period TD, and a third reference time period TE are employed.

Figure 9:
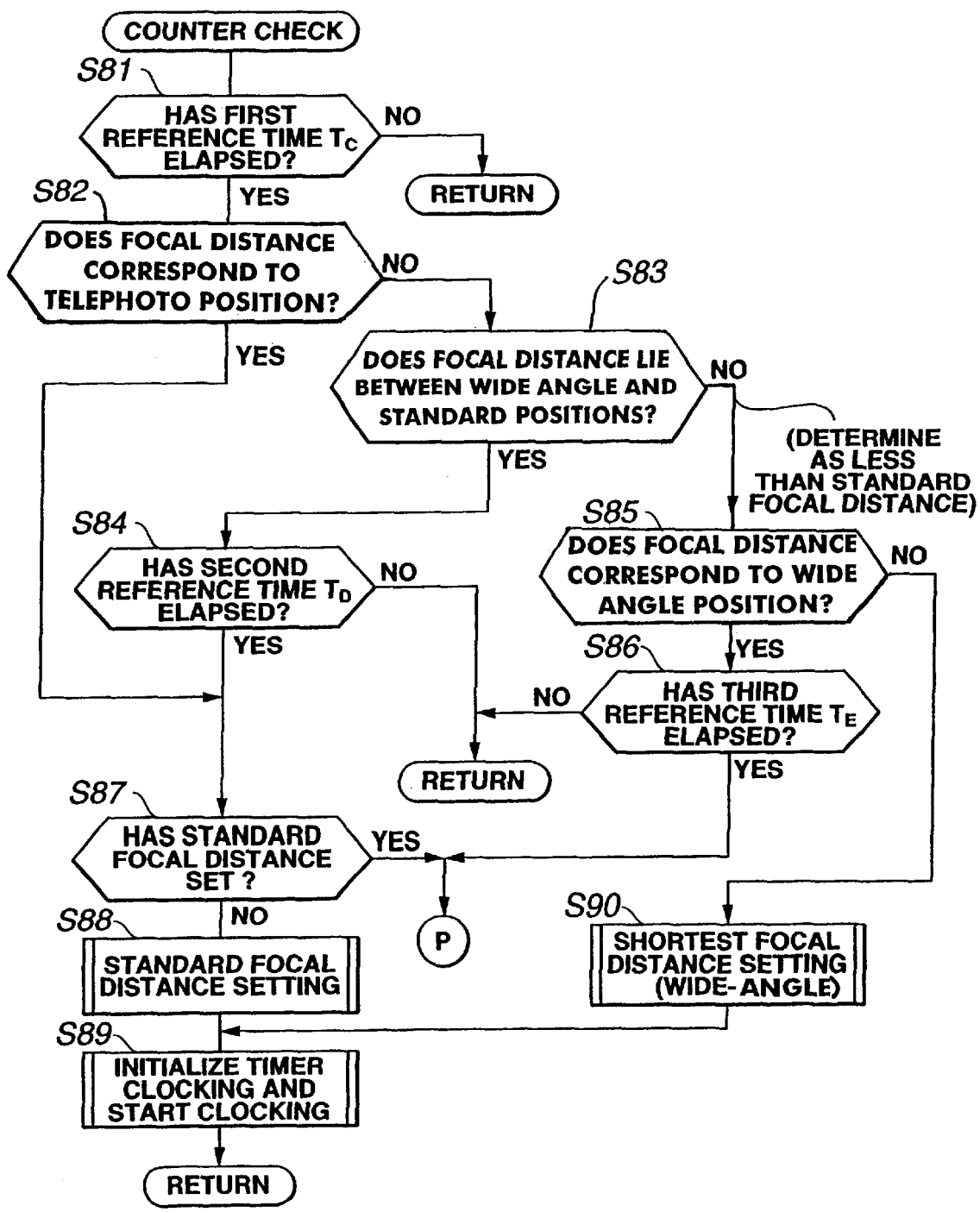
FIG. 9 is a flow chart of a counter check process of a subroutine called in a main routine in a camera according to the sixth embodiment of the present invention.

FIG. 9 is a flow chart of a counter check process of a subroutine called in steps S6, S8, and S10 (see FIG. 3) of a photographic sequence (main routine) in the camera according to the sixth embodiment.

The processes in the first step S81 and step S84 in the counter check process are the same as the processes in steps S71 and S74 in the fifth embodiment. More specifically, when a non-operation time period T0 exceeds the first reference time period TC and the lens barrel 2 is located at the telephoto position, the CPU 12 shifts to step S87. When the lens barrel 2 is not located at the telephoto position, and the lens barrel 2 is extended between the telephoto position P2D and the intermediate position P2C having the standard focal length, the CPU 12 shifts to step S84. When the non-operation time exceeds the second reference time period TD, the CPU 12 shifts to step S87. When the lens barrel 2 is not extended between the telephoto position and the intermediate position, i.e., the lens barrel 2 is located before the intermediate position P2C and has a focal length smaller than the standard focal length, the CPU 12 shifts to step S85.

In step S85, the extended state of the lens barrel 2 is checked by the focal length detection means. When the lens barrel 2 is located at the wide angle position P2B, the CPU 12 shifts to step S86. When the lens barrel 2 is not located at the wide angle position P2B, the CPU 12 shifts to step S90.

In step S86 described above, it is checked whether the clocked time period T0 of the non-operation time counter section 12a exceeds the third reference time period TE by the clocking output decision means. If the clocked time period T0 does not exceed the third reference time period TE, the CPU 12 returns to the main routine. If the clocked time period T0 exceeds the third reference time period TE, the CPU 12 shifts to step S22 of the main routine, and the setup motor 14 is driven to withdraw the lens barrel 2 to the storage position P2A.

In step S90, the lens barrel 2 is set at the wide angle position having the smallest focal length. More specifically, the zoom motor 16 is driven to drive the lens barrel 2 to the wide angle position P2B, and the CPU 12 shifts to step S89.

In the step S87, it is checked whether the lens barrel 2 is at the intermediate zoom position P2C. If so, the CPU 12 shifts to step S22 of the main routine, and the setup motor 14 is driven to withdraw the lens barrel 2 to the storage position P2A. If not, the CPU 12 shifts to step S88 and the zoom motor 16 is driven to execute a standard focal length setting process. More specifically, the lens barrel 2 is moved to the intermediate zoom position P2C. The CPU 12 returns to step 89.

In step S89, the non-operation time counter section 12a of the CPU 12 is reset (initialized) to start clocking (clocking means and non-operation state detection means). Thereafter, the CPU 12 returns to the main routine.

FIG. 17 is a diagram showing reciprocating operation states of the lens barrel 2 when a non-operation time continues in focal length states in the camera according to the sixth embodiment.

When the lens barrel 2 is in the telephoto position and the non-operation time period T0 reaches the reference time period TC, the lens barrel 2 is temporarily withdrawn to an intermediate zoom position (standard focal length). Thereafter, when the non-operation time period exceeds the reference time period TD, the lens barrel 2 is withdrawn to the position.

When the lens barrel 2 is located between the telephoto and intermediate zoom positions and the non-operation continuation time period reaches the reference time period TD, the lens barrel 2 is temporarily moved to the intermediate zoom position. Thereafter, when the non-operation time period exceeds the reference time period TD, the lens barrel 2 is withdrawn to the storage position.

When the lens barrel 2 is in the intermediate zoom position (standard focal length state), and when the non-operation time period reaches the reference time period TD, the lens barrel 2 is withdrawn to the storage position.

When the lens barrel 2 is located between the intermediate zoom position and the wide angle position and the non-operation time period reaches the reference time period TC, the lens barrel 2 is temporarily withdrawn to the wide angle position. Thereafter, when the non-operation continuation time period exceeds the reference time period TE, the lens barrel 2 is withdrawn to the storage position.

When the lens barrel 2 is located at the wide angle position and the non-operation time period reaches the reference time period TE, the lens barrel 2 is withdrawn to the storage position.

According to the camera of the sixth embodiment, the same advantage as that obtained in the cameras according to the first and third embodiments. In particular, when the lens barrel 2 is located at the wide angle position P2B, after a predetermined non-operation continuation time period has elapsed, the lens barrel 2 is collapsed into the storage position. However, when the lens barrel 2 is located at a position on the wide angle side with respect to the intermediate zoom position P2C and a predetermined non-operation continuation time period has elapsed, the lens barrel 2 is temporarily withdrawn to the wide angle position P2B. It is kept at this position for a predetermined non-operation time period. Therefore, when the lens barrel 2 is located near the wide angle position, the lens barrel 2 is caused to wait at the wide angle position for a longer time, so that the camera can immediately shift to a photographic state when it is the moment for a good picture.

Seventh Embodiment

A camera according to the seventh embodiment of the present invention will be described below.

The camera according to this embodiment has substantially the same configuration as the configuration shown in FIGS. 1A to 1D and FIG. 2 of the camera according to the first embodiment, and performs the same processes as those in the photographic sequence (main routine) shown in the flow chart in FIG. 3. However, the seventh embodiment is different from the first embodiment in the counter check process of the subroutine in the main routine. In the camera of this embodiment, as a piece of reference decision time information to be compared with a non-operation continuation time period, a reference time period Tf which changes as a predetermined function of the value of a focal length f of the lens barrel 2.

Figure 10:
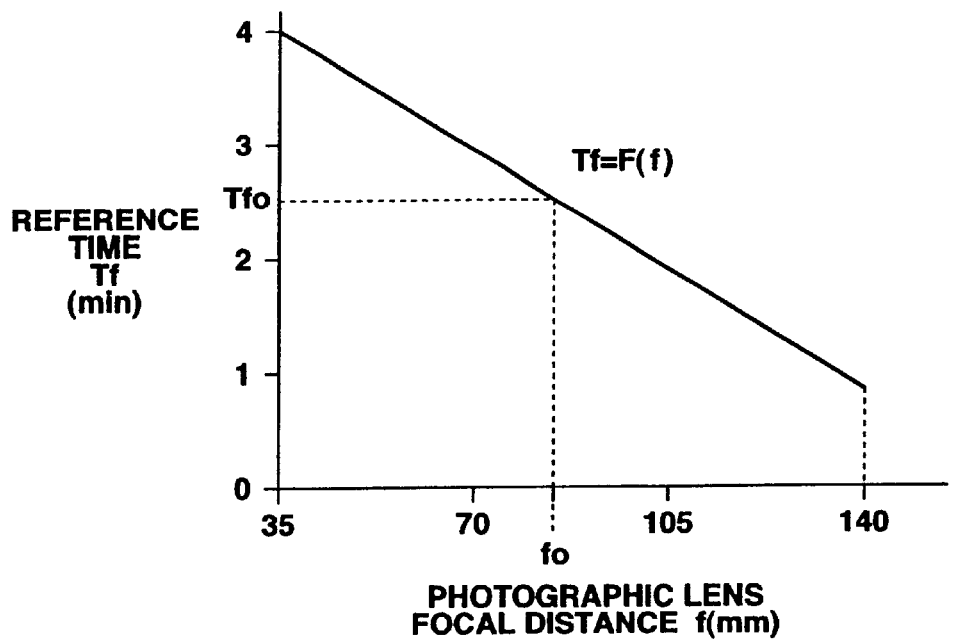
FIG. 10 is a graph showing a change in reference time corresponding to a focal length applied in a camera according to the seventh embodiment of the present invention.

In an example shown in FIG. 10, a function F(f) linearly changes in the graph. The function F(f) need not linearly change, and may be given by a characteristic curve which is practically used. In addition, calculation information of the function F(f) is stored in a memory section of the CPU 12 serving as a time setting means. As needed, reference decision time Tf corresponding to the focal length f are calculated by the CPU 12. In the memory section, in place of the function F(f) information, a reference decision time information table given by the function F(f) may be stored and called as needed.

Figure 11:
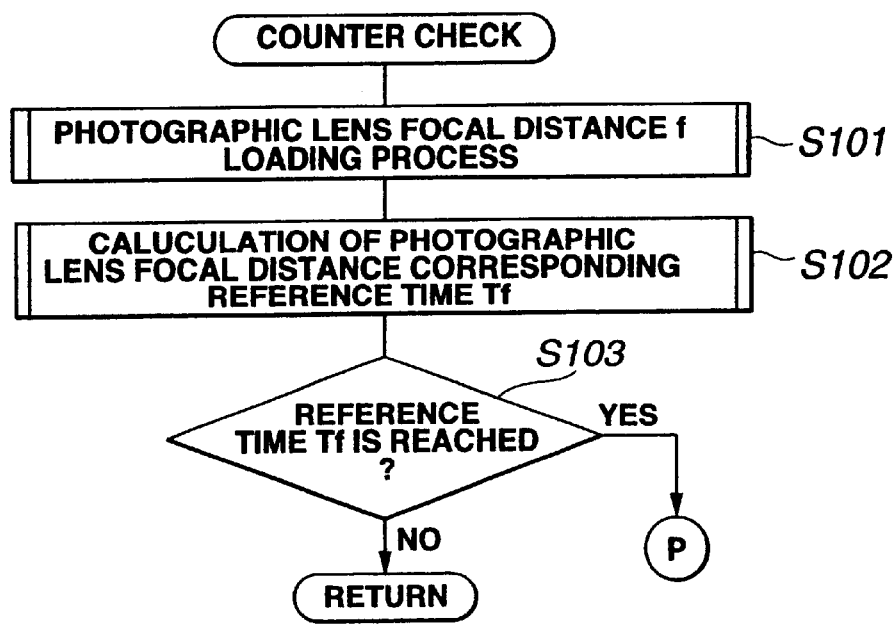
FIG. 11 is a flow chart of a counter check process of a subroutine called in a main routine in the camera according to the seventh embodiment.

FIG. 11 is a flow chart of a counter check process of a subroutine called in steps S6, S8, and S10 (see FIG. 3) of a photographic sequence (main routine) in the camera according to the seventh embodiment.

In the counter check process, the present focal length f of a lens barrel 2 is loaded through a zoom encoder 20 in step S101. In step S102, a reference time period Tf corresponding to the focal length f is calculated. It is checked in step S103 whether a clocked time period T0 of a non-operation time counter section 12a exceeds the reference time period Tf by clocking output decision means. If the clocked time period T0 does not exceed the reference time period Tf, the CPU 12 returns to the main routine. If the clocked time period T0 exceeds the reference time period Tf, the CPU 12 shifts to step S22 of the main routine, and a zoom motor 16 and a setup motor 14 are driven to retract the lens barrel 2 to the storage position P2A.

FIG. 18 is a diagram showing reciprocating operation states of the lens barrel 2 when a non-operation time period continues in focal length states in the camera according to the seventh embodiment.

When the lens barrel 2 is located at the telephoto or wide angle position or anywhere therebetween, and the non-operation continuation time period reaches a reference time period Tf0 corresponding to an initial focal length f0, the lens barrel 2 is moved to the storage position.

According to the camera of the seventh embodiment described above, the same advantage as that obtained in the camera according to the first embodiment. In particular, reference decision time which exactly varies according to variation in the focal length f of the lens barrel 2 is used, so that the lens barrel 2 can be collapsed when the corresponding non-operation time period has elapsed.

In each of the embodiments described above, the storage position of the lens barrel is a collapsed position where a photographic operation cannot be performed. However, in each embodiment, the storage position may be a wide angle position or a photographic preparation position at which the camera can directly shift to a photographic operation. In this case, the lens barrel 2 may be withdrawn to the storage position after a non-operation time period continues for a predetermined time period.

In each of the embodiments, when a non-operation time period continues for a time period corresponding to each focal length position of the lens barrel, the lens barrel 2 is controlled to be moved to the storage position. However, the present invention is not limited to the embodiments, a state of the lens barrel except for a reciprocating position, for example, a moving position of an electric flash may be controlled.

The present invention can also be applied to a camera using a zoom lens which continuously varies the focal length of the lens, and can also be applied to a camera using a zoom lens which discretely changes the focal length of the lens.

As described above, in the camera according to the present invention, in a camera having a photographic lens whose focal length can be changed or varied and which can be driven, when a non-operation time continues for a predetermined reference time which changes depending on a lens frame extended state, the photographic lens is controlled to be withdrawn to a collapse position, a photographic preparation position, or a predetermined focal length position. When the control is performed as described above, a user does not miss the moment for a good picture. In addition, the lens frame can be effectively protected.

What is claimed is:

1. A camera comprising:
   a photographic lens having an optical system whose focal length can be changed;
   a photographic lens drive mechanism for driving the photographic lens to a storage position and at least one photographable position and for driving the photographic lens to change its focal length
   an encoder for detecting the focal length of the photographic lens;
   a timer for clocking a non-operation time of the camera while it is in one of the at least one photographable position;
   a timer output decision circuit for comparing the output of the timer with a selected one of a plurality of reference decision time periods according to an output from the encoder to decide whether the output from the timer reaches the selected reference decision time period or not; and
   a control circuit for driving the photographic lens drive mechanism according to an output from the timer output decision circuit to drive the photographic lens to the storage position.

2. A camera according to claim 1, wherein the control circuit is constituted by a central processing unit which also defines the timer and the timer output decision circuit.

3. A camera comprising:
   a photographic lens having an optical system whose focal length can be varied;
   photographic lens drive means for driving the photographic lens to a storage position and at least one photographable position and for driving the photographic lens to vary the focal length of the photographic lens;
   a detector for detecting the focal length of the photographic lens;
   clocking means for clocking a non-operation time of the camera while it is in one of the at least one photographable position;
   clocking output decision means for comparing the output of the clocking means with a selected one of a plurality of reference decision time periods according to an output from the detector to decide whether the output from the clocking means reaches the selected reference decision time period or not; and control means for driving the photographic lens drive mechanism according to an output from the clocking output decision means to drive the photographic lens to the storage position.

4. A camera according to claim 3, wherein the photographic lens drive means includes:

a first motor for driving the photographic lens between the storage position and the photographable positions; and a second motor for driving the photographic lens to vary its focal length.

5. A camera according to claim 3, wherein the plurality of reference decision times is at least three reference decision times.

6. A camera comprising:

a photographic lens having a zoom optical system;

a photographic lens drive mechanism for driving the photographic lens to a position of a photographic preparation state and a position of a photographable state and for driving the photographic lens to vary the focal length of the photographic lens;

an encoder for detecting the focal length of the photographic lens;

a timer for clocking a non-operation time of the camera while it is in the photographable state;

a timer output decision circuit for comparing the output of the timer with a selected one of a plurality of reference decision time information according to an output from the encoder to decide whether the output from the timer reaches the selected reference decision time information or not; and a control circuit for controlling the photographic lens to drive the photographic lens to the photographic preparation position according to an output from the timer output decision circuit through the photographic lens drive mechanism.

7. A camera according to claim 6, wherein the control circuit is constituted by a central processing unit which also defines the timer and timer output decision circuit.

8. A camera comprising:

a photographic lens having an optical system whose focal length can be varied;

photographic lens drive means for driving the photographic lens to a position of a photographic preparation state and a position of a photographable state and for driving the photographic lens to vary the focal length of the photographic lens;

detection means for detecting the focal length of the photographic lens;

clocking means for clocking a non-operation time of the camera while it is in the photographable state;

clocking output decision means for comparing the output of the clocking means with a selected one of a plurality of pieces of reference decision time information according to an output from the detection means to decide whether the output from the clocking means reaches the reference decision time information or not; and control means for controlling the photographic lens to drive the photographic lens to the position of the photographic preparation position according to an output from the clocking output decision means through the photographic lens drive means.

9. A camera comprising:

a photographic lens whose focal length can be varied;

a non-operation state detection circuit for detecting a non-operation state of the camera in a photographable state;

an encoder for detecting the focal length of the photographic lens;

a timer for clocking a non-operation time of the camera while it is in the photographable state;

a lens drive mechanism for driving the photographic lens to vary the focal length of the photographic lens;

a reference time storage circuit having reference decision time information, to be compared with a clocking output from the timer, according to an output from the encoder; and a control circuit for comparing the clocked output with the reference decision time information and for driving the lens drive mechanism when it is determined that the clocked output reaches the reference decision time to set the focal length of the photographic lens to be a specific focal length.

10. A camera according to claim 9, wherein the control circuit is constituted by a central processing unit which also defines the timer, the non-operation state detection circuit, and the reference time storage circuit.

11. A camera comprising:

a photographic lens whose focal length can be varied;

non-operation state detection means for detecting a non-operation state of the camera while it is in a photographable state;

detection means for detecting the focal length of the photographic lens;

clocking means for clocking a non-operation time of the camera while the camera is in the photographable state;

drive means for driving the photographic lens to vary the focal length of the photographic lens;

reference time storage means having reference decision time information, to be compared with a clocking output from the clocking means, according to an output from the detection means; and control means for comparing the clocking output with the reference decision time information and for driving the drive means when it is determined that the time represented by the clocking output reaches the reference decision time to set the focal length of the photographic lens to be a specific focal length.

12. A camera according to claim 11, wherein, when the photographic lens is set at the specific focal length, the focal length is set to be an intermediate value between a largest focal length and a smallest focal length of the photographic lens.

13. A camera according to claim 11, wherein the specific focal length is the smallest focal length of the photographic lens.

14. A camera comprising:

a photographic lens whose focal length can be changed;

a non-operation state detection circuit for detecting a non-operation state of the camera while it is in a photographable state;

an encoder for detecting the focal length of the photographic lens;

a timer for clocking a non-operation time of the camera while it is in the photographable state;

a lens drive mechanism for driving the photographic lens;

a reference time storage circuit having reference decision time information, to be compared with a clocking output from the timer, according to an output from the encoder; and a control circuit for comparing the clocked time represented by the clocking output with the reference decision time information, and for driving the lens drive mechanism when it is determined that the clocked time reaches the reference decision time to set the position of the photographic lens to be a specific position.

15. A camera according to claim 14, wherein the control circuit is constituted by a central processing unit which also defines the timer, the non-operation state detection circuit, and the reference time storage circuit.

16. A camera comprising:

a photographic lens whose focal length can be varied;

non-operation state detection means for detecting a non-operation state of the camera while it is in a photographable state;

detection means for detecting the focal length of the photographic lens;

clocking means for clocking a non-operation time of the camera while it is in the photographable state;

drive means for driving the photographic lens;

reference time storage means having a plurality of reference decision time information, a selected one of which is to be compared with a clocking output from the clocking means according to an output from the detection means; and control means for comparing the clocked time represented by the clocking output of the clocking means with the reference decision time information and for driving the drive means when it is determined that the clocked time reaches the reference decision time to set the position of the photographic lens to be a specific position.

17. A camera according to claim 16, wherein the specific position is a collapsed position.

18. A camera according to claim 16, wherein the specific position is a photographic preparation position at which a photographic operation can be performed.

19. A camera comprising:

a photographic lens whose focal length can be varied;

non-operation state detection means for detecting a non-operation of the camera while it is in a photographable state;

drive means for driving the photographic lens to vary its focal length; and control means for receiving an output from the non-operation state detection means and causing the photographic lens to be driven by the drive means to a position having a focal length which is smaller than a focal length in the non-operation state and, thereafter, when an output from the non-operation state detection means is received, driving the photographic lens by the drive means to perform one of setting of the photographic lens at a smallest focal length and setting of the photographic lens at a collapse position.

20. A camera comprising:

a photographic lens whose focal length can be varied;

a non-operation state detection circuit for detecting a non-operation state of the camera while it is in a photographable state;

a lens drive mechanism for driving the photographic lens to vary a focal length of the photographic lens; and a control circuit for receiving an output signal from the non-operation state detection circuit, when the photographic lens has a focal length which is greater than or equal to a standard focal length, driving the photographic lens to set the focal length of the photographic lens to be the standard focal length, and, when the photographic lens has a focal length which is smaller than the standard focal length, driving the lens drive mechanism to set the focal length of the photographic lens to be a smallest focal length.

21. A camera according to claim 20, wherein the control circuit includes the non-operation state detection circuit, and comprises a central processing unit.

22. A camera comprising:

a photographic lens whose focal length can be varied;

non-operation state detection means for detecting a non-operation state of the camera while it is in a photographable state;

drive means for driving the photographic lens to vary a focal length of the photographic lens; and control means for receiving an output signal from the non-operation state detection circuit, when the photographic lens has a focal length which is greater than or equal to a standard focal length, driving the drive means to set the focal length of the photographic lens to be the standard focal length, and, when the photographic lens has a focal length which is smaller than the standard focal length, driving the drive means to set the focal length of the photographic lens to be a smallest focal length.

23. A camera comprising:

a photographic lens whose focal length can be varied;

a detection circuit for detecting the focal length of the photographic lens, a clocking circuit for clocking a non-operation state continuation time of the camera in the photographable state;

a drive circuit for driving the photographic lens to vary the focal length of the photographic lens;

a time setting circuit for generating a reference time as a function of the focal length of the photographic lens to be compared with a clocked time obtained by the clocking circuit; and a control circuit for comparing a clocked time output obtained by the clocking circuit with the reference time of the time setting circuit, and, when the clocked time output obtained by the clocking circuit reaches the reference time, controlling the photographic lens to drive the photographic lens to a specific focal length position.

24. A camera comprising:

a photographic lens whose focal length can be varied;

detection means for detecting the focal length of the photographic lens;

clocking means for clocking a non-operation state continuation time of the camera while it is in the photographable state;

drive means for driving the photographic lens to vary the focal length of the photographic lens;

time setting means having reference time information, to be compared with a clocked time obtained by the clocking means, which reference time information varies as a function of the focal length of the photographic lens; and control means for comparing the clocked time of the clocking means with the reference time of the time setting means and, when an output from the clocking means reaches the reference time, controlling the photographic lens to drive the photographic lens to a specific focal length position.

25. A camera according to claim 24, wherein the specific focal length of the photographic lens is a smallest focal length.

26. A camera according to claim 24, wherein the specific focal length of the photographic lens is a standard focal length.

27. A camera according to claim 26, wherein the specific focal length of the photographic lens is 50 mm.

28. A camera according to claim 26, wherein the standard focal length is an almost intermediate value between a largest focal length and a smallest focal length.

29. A camera comprising:
a photographic lens whose focal length can be varied;
a detection circuit for detecting the focal length of the photographic lens;
a clocking circuit for clocking a non-operation state continuation time of the camera in the photographable state;
a drive circuit for driving the photographic lens to vary a position of the photographic lens on an optical axis of the photographic lens;
a time setting circuit for generating a reference time depending on the focal length of the photographic lens to be compared with a clocked time obtained by the clocking circuit; and
a control circuit for comparing an output of the clocked time with the reference time of the time setting circuit and, when an output from the clocked time reaches the reference time, controlling the photographic lens to drive the photographic lens to a specific position.

30. A camera comprising:
a photographic lens whose focal length can be varied;
detection means for detecting the focal length of the photographic lens;
clocking means for clocking a non-operation state continuation time of the camera in the photographable state;
drive means for driving the photographic lens to change a position of the photographic lens on an optical axis of the photographic lens;
time setting means having reference time information, to be compared with a clocked time obtained by the clocking means, which reference time information varies as a function of the focal length of the photographic lens; and
control means for comparing an output of the clocked time with the reference time of the time setting means and, when an output from the clocked time reaches the reference time, controlling the photographic lens to drive the photographic lens to a specific position.

31. A camera according to claim 30, wherein the specific position of the photographic lens is a storage position.

32. A camera according to claim 30, wherein the specific position of the photographic lens is a smallest focal length position.

33. A camera according to cl aim 30, wherein the specific position of the photographic lens is a photographic preparation position at which a photographic operation can be performed.

34. A camera according to claim 33, wherein the photographic preparation position of the photographic lens is a position of a standard focal length.

35. A camera comprising:
a photographic lens having an optical system whose focal length can be varied;
one or more motors for driving the photographic lens to between a storage position and a series of photographable positions having different focal lengths;
an encoder for detecting the focal length of the photographic lens;
a timer for clocking a non-operation state continuation time of the camera while it is in one of the photographable positions;
a timer output decision circuit, having pieces of reference decision time information to be compared with a clocking output from the timer, for comparing the clocking output with one of the pieces of reference decision time information according to an output from the encoder to decide whether the output from the timer reaches the reference decision time information or not; and
a control circuit for driving the photographic lens drive mechanism according to an output from the timer output decision circuit to drive the photographic lens to the storage position.

36. A camera comprising:
a photographic lens whose focal length can be varied;
a non-operation state detection circuit for detecting a non-operation state of the camera while it is in a photographable state;
an encoder for detecting the focal length of the photographic lens;
a timer for clocking a non-operation state continuation time of the camera while it is in the photographable state;
a lens drive mechanism for driving the photographic lens;
a reference time storage circuit having reference decision time information, to be compared with a clocking output from the timer, according to an output from the encoder; and
a control circuit for comparing the clocked time with the reference decision time information and for driving the lens drive mechanism when it is determined that the clocked time reaches the reference decision time to set the position of the photographic lens to be a specific position.

37. A camera comprising:
a photographic lens whose focal length can be varied;
a detection circuit for detecting the focal length of the photographic lens;
a clocking circuit for clocking a non-operation state continuation time of the camera while it is in the photographable state;
a drive circuit for driving the photographic lens to vary a position of the photographic lens on an optical axis of the photographic lens;
a time setting circuit for generating a reference time depending on the focal length of the photographic lens to be compared with a clocked time obtained by the clocking circuit; and
a control circuit for comparing an output of the clocked time with the reference time of the time setting circuit and, when an output from the clocked time reaches the reference time, controlling the photographic lens to drive the photographic lens to a specific position.

38. A process for controlling the movement of a zoom lens of a camera, the zoom lens being moveable between a storage position and a plurality of picture taking positions covering a picture taking range, the process comprising:

determining a position of the zoom lens within the picture taking range;

moving the zoom lens into the storage position after the camera has not been operated for a time period which varies as a function of the determined position of the zoom lens within the picture taking range.

39. A process according to claim 38, wherein the zoom lens is moved into the storage position after a first period of time when the position of the zoom lens falls within a first sub-range of the picture taking range and the zoom lens is moved into the storage position after a second period of time, which is greater than the first time period, when the position of the zoom lens falls with a second sub-range of the picture taking range.

40. A process according to claim 39, wherein the first sub-range is a single position.

41. A process according to claim 40, wherein the first sub-range is the longest focal length of the zoom lens.

42. A process according to claim 41, wherein the longest focal length of the zoom lens is a telephoto position of the zoom lens.

43. A process according to claim 42, wherein the second sub-range is all picture taking positions of the zoom lens other than the telephoto position.

44. A process according to claim 42, wherein the picture taking positions of the zoom lens vary from the telephoto position to a wide angle position.

45. A process according to claim 38, wherein:

when the position of the zoom lens falls with a first sub-range of the picture taking range, the zoom lens is moved into the storage position after a first time period has expired;

when the position of the zoom lens falls with a second sub-range of the picture taking range, the zoom lens is moved into the storage position after a second time period, which is different than the first time period, has expired; and when the position of the zoom lens falls within a third sub-range of the picture taking range, the zoom lens is moved into the storage position after a third time period, which is different than the first and second time periods, has expired.

46. A process according to claim 45, wherein the first sub-range is a single position.

47. A process according to claim 46, wherein the first sub-range is the longest focal length of the zoom lens.

48. A process according to claim 47, wherein the longest focal length of the zoom lens is a telephoto position of the zoom lens.

49. A process according to claim 48, wherein the second sub-range is all picture taking positions of the zoom lens between the longest and the shortest focal lengths of the zoom lens.

50. A process according to claim 49, wherein the picture taking positions of the zoom lens vary from the telephoto position to a wide angle position.

51. A process according to claim 50, wherein the third sub-range is the wide angle position.

52. A process according to claim 51, wherein the first time period is shorter than the second time period.

53. A process according to claim 52, wherein the second time period is shorter than the third time period.

54. A process according to claim 38, wherein the zoom lens is moved into and temporarily retained at an intermediate focal length position, located between the longest and shortest focal length position of the zoom lens in the picture taking range, before it is moved into the storage position.

55. A process according to claim 54, wherein the intermediate focal length position is approximately half way between the longest and shortest focal lengths of the zoom lens in the picture taking range.

56. A process according to claim 54, wherein the intermediate position is 50 mm.

57. A process according to claim 54, wherein the zoom lens is moved into and temporarily retained at the intermediate focal length position only when the position of the zoom lens is not in the shortest focal length position.

58. A process according to claim 57, wherein:

when the zoom lens is in the longest focal length position, it is moved into and temporarily retained at the intermediate focal length position after a first non-operation time period has expired;

when the zoom lens is in any position within the picture taking range excluding the longest, the intermediate and the shortest focal length positions, it is moved into and temporarily retained at the intermediate focal length position after a second non-operation lime period, which is different than the first non-operation time period, has expired.

59. A process according to claim 58, wherein the first non-operation time period is shorter than the second non-operation time period.

60. A process according to claim 58, wherein:

when the zoom lens is in the intermediate focal length position, it is moved into the storage position after a third non-operation time period has expired; and when the zoom lens is in the shortest focal length position, it is moved into the storage position after a fourth non-operation time period, different from the third non-operation time period has expired.

61. A process according to claim 60, wherein the third non-operation time period is shorter than the fourth non-operation time period.

62. A process according to claim 54, wherein:

when the zoom lens is in the longest focal length position, it is moved into and temporarily retained at the intermediate focal length position after a first non-operation time period has expired;

when the zoom lens is in any position within the picture taking range excluding the longest and shortest focal length positions, it is moved into and temporarily retained at the intermediate focal length position after a second non-operation time period, different than the first non-operation time period, has expired; and when the zoom lens is in the shortest focal length position, it is moved into and temporarily retained in -the intermediate focal length position after a third non-operation time period, different than the first and second non-operation time periods, has expired.

63. A process according to claim 62, wherein the first non-operation time period is shorter than the second non-operation time period.

64. A process according to claim 63, wherein the second non-operation time period is shorter than the third non-operation time period.

65. A process according to claim 64, wherein when the zoom lens is in the intermediate focal length position, it is moved to the storage position after a fourth non-operation time period has expired.

66. A process according to claim 63, wherein when the zoom lens is in the intermediate focal length position, it is moved to the storage position after a fourth non-operation time period has expired.

67. The process according to claim 38, wherein when the position of the zoom lens is longer than an intermediate focal length position located between the longest and the shortest focal lengths of the zoom lens in the picture taking range, the zoom lens is moved into and temporarily retained at the intermediate focal length position after not less than a first non-operation time period has expired.

68. The process according to claim 67, wherein:

when the zoom lens is in the longest focal length position, the zoom lens is moved into the intermediate focal length position after the first non-operation time period has expired; and when the zoom lens is in any position intermediate the longest and intermediate focal length positions, it is moved into the intermediate focal length position after a second non-operation time period, which is greater than the first non-operation time period, has expired.

69. The process according to claim 68, wherein when the zoom lens is located in the intermediate focal length position it is moved into the storage position after a third non-operation time period has expired.

70. The process according to claim 69, wherein the third non-operation time period is equal in length to the second non-operation time period.

71. The process according to claim 70, when the zoom lens is located between the standard and shortest focal length positions, it is moved into the storage position after a fourth non-operation time period, different than the first and second non-operation time periods, has expired.

72. The process according to claim 38, wherein:

when the zoom lens zoom lens is located at a focal length position which is greater than an intermediate focal length position located between the shortest and longest focal length positions of the zoom lens in the picture taking range, it is moved into and temporarily retained in the intermediate focal length position after a non-operation time period which is not less than a first non-operation time period has expired; and when the zoom lens is located at a focal length position which is less than the intermediate focal length position but greater than the shortest focal length position, the zoom lens is moved into and temporarily retained in the shortest focal length position after not less than a second non-operation time period, different than the first non-operation time period, has expired.

73. The process according to claim 72, wherein:

when the zoom lens is located at the longest focal length position, it is moved into and temporarily retained in the intermediate focal length position after the first non-operation time period has expired; and when the zoom lens is located between the longest and the intermediate focal length positions, it is moved into and is temporarily retained in the intermediate focal length position after a third non-operation time period, which is greater than the first non-operation time period, has expired.

74. The process according to claim 73, wherein when the zoom lens is located in the intermediate focal length position, it is moved into the storage position after a fourth non-operation time period has expired.

75. The process according to claim 74, wherein the fourth non-operation time period is equal to the third non-operation time period.

76. The process according to claim 74, wherein when the zoom lens is located in the shortest focal length position, it is moved into the storage position after a fifth non-operation time period has expired.

77. The process according to claim 76, wherein the fifth non-operation time period is longer than the first, second and third non-operation time periods.

78. The process according to claim 74, wherein the fourth non-operation time period is equal to the third non-operation time period.

* * * * *